United States Patent [19]
Åberg

[11] Patent Number: 5,539,654
[45] Date of Patent: Jul. 23, 1996

[54] CONTROL OF POWER NETWORK

[75] Inventor: Anders Åberg, Staffanstorp, Sweden

[73] Assignee: Asea Brown Boveri AB, Vasteras, Sweden

[21] Appl. No.: 30,276

[22] PCT Filed: Nov. 3, 1992

[86] PCT No.: PCT/SE92/00754

§ 371 Date: Mar. 26, 1993

§ 102(e) Date: Mar. 26, 1993

[87] PCT Pub. No.: WO93/09587

PCT Pub. Date: May 13, 1993

[30] Foreign Application Priority Data

Nov. 4, 1991 [SE] Sweden .................................. 9103229
Nov. 4, 1991 [SE] Sweden .................................. 9103230

[51] Int. Cl.$^6$ .............................. H02J 3/24; H02J 3/36
[52] U.S. Cl. ..................... 364/494; 364/492; 364/495
[58] Field of Search ................................. 364/495, 494,
364/492, 481, 483, 578; 323/234, 293,
318, 352, 220, 233, 275; 363/98, 37, 35,
39, 40, 45–48; 361/47; 307/153

[56] References Cited

U.S. PATENT DOCUMENTS

| | | |
|---|---|---|
| 3,863,270 | 1/1975 | Haley et al. .................. 364/495 X |
| 3,903,402 | 9/1975 | Petit et al. .................... 364/495 X |
| 4,442,397 | 4/1984 | Ishikawa et al. .................. 323/275 |
| 4,618,779 | 10/1986 | Wiscombe .................... 364/492 X |
| 4,770,841 | 9/1988 | Haley et al. ...................... 376/216 |
| 4,994,981 | 2/1991 | Walker et al. .................... 364/492 |
| 5,025,402 | 6/1991 | Winkelstein .................... 364/578 |
| 5,117,323 | 5/1992 | Asplund .......................... 361/47 |
| 5,177,695 | 1/1993 | Sung et al. ...................... 364/553 |

Primary Examiner—Emanuel T. Voeltz
Assistant Examiner—M. Kemper
Attorney, Agent, or Firm—Watson Cole Stevens Davis

[57] ABSTRACT

A method and a device for controlling at least one of a first power network (1) and a second power network (3), which are interconnected by means of at least two conductors (2), wherein the first power network comprises at least one current or voltage generator (5) and at least one of the first and the second power networks comprises at least one controllable network element (4). A section B—B through the conductors is defined such that the power networks are located on different sides of the section and at least one line current (IL(k)) and at least one voltage (V(j), E(n)) are sensed at the section. At least one base mode (BM(p)) is formed in dependence on sensed current(s) and sensed voltage(s) and at least one control signal (C(r)) is generated in dependence on the base mode(s) and is supplied to the network element(s) in order to influence currents and/or voltages, occurring in section B—B or in the second power network and generated by the current or voltage generator(s). (FIG. 12).

48 Claims, 23 Drawing Sheets

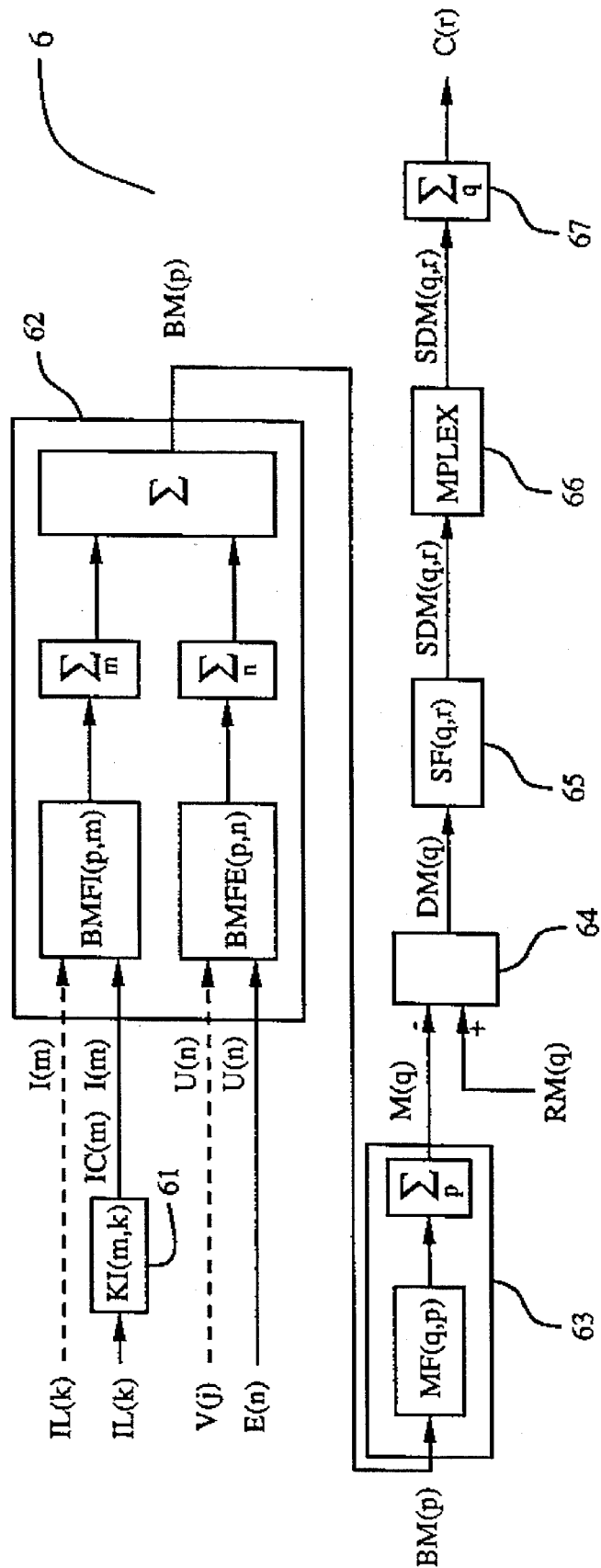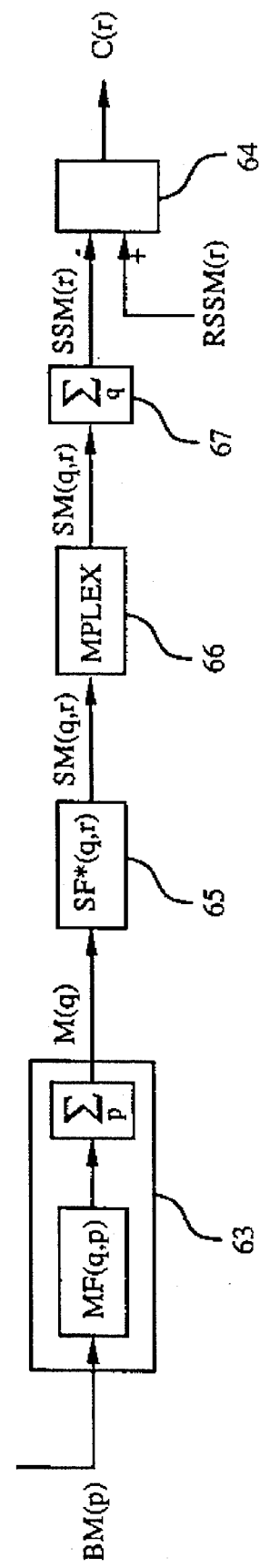
Fig. 2a
Fig. 2b

{ 5,539,654 }

CONTROL OF POWER NETWORK

TECHNICAL FIELD

The present invention relates to a method, and to a device for carrying out the method, for control of at least one of a first and a second power network, which are interconnected by means of at least two conductors, for the purpose of controlling, according to a predetermined criterion, the influence by one of the networks on the other network. The first power network comprises at least one current or voltage generator with associated internal impedance and at least one of the first and the second power networks comprises at least one controllable network element.

The device comprises a control member which, based on a direction-dependent signal processing, generates control signals for control of controllable network elements arranged in the power network.

BACKGROUND ART

It is known that, for example in plants for transmission of high-voltage direct current, the properties of the power network connected to the convertor render difficult a feedback control of, for example, harmonics in the d.c. network. These difficulties may consist of the connected network exhibiting non-minimum phase properties but may also consist of the connected network, as a result of different operating configurations due to switchings, exhibiting different transmission properties at different times. The physical reason for the non-minimum phase properties of a power network can be explained by the fact that the events which take place along the power line in this connection must be regarded as electromagnetic waves which propagate along the power line and that these waves, at points where the impedance characteristic of the power line is changed, are reflected (see, e.g., Walter C. Johnson: Transmission Lines and Networks, McGraw-Hill International Editions 1984.) This entails multiple delay effects (echoes) in the response of the power network to control interferences since the attenuation of the travelling waves by the network itself is very low. It is known from textbooks in feedback control theory, for example Bernard Friedland: Control System Design, McGraw-Hill International Editions 1987, in particular pages 78, 144 and 188, note 4.7, and Richard C. Dorf: Modern Control Systems, Addison-Wesley Publishing Company, fourth edition 1986, in particular pages 262–264, that non-minimum phase properties for a transfer function entail zeros in the righthand half-plane of the complex s-plane and that in such cases it is not possible to achieve a stable feedback control with very short settling times.

In IEE Transactions on Industry Applications, Vol 24, No. 4, July/August 1988, pages 582–588, there is described a controller of repetitive type for the purpose of eliminating system deviations in the steady state while being influenced by cyclic disturbances. The introduction of a memory for storage of signal values in the controller makes it possible to achieve a good cancellation of a stationary cyclic disturbance also with a gain in the feedback loop which is low for reasons of stability. However, a low gain means that the contents of the memory is corrected relatively slowly during non-steady states.

The principal drawback in this case is that both delay effects and other non-minimum phase properties and other kinds of dynamic properties are not taken into consideration and compensated for. The correction of the memory contents with the system deviation delayed one cycle may render the controller unstable since in reality both implicit and explicit delay effects may occur in addition to other kinds of dynamic properties. The total delay in the system may amount to more than one cycle and even if the controlled system is stable, the attenuation of disturbances, repeated once every cycle, will not be good.

Complicated, varying or otherwise limiting dynamic properties for parts of power networks, caused by, for example, switchings or by non-minimum phase properties, thus make certain desirable control tasks very difficult or even impossible to solve.

SUMMARY OF THE INVENTION

The invention aims to provide a method of the kind described in the introductory part of the description, which particularly in those cases where one of the power networks makes difficult a control by exhibiting complicated, varying or otherwise limiting dynamic properties for control in general, caused by, for example, switchings or by non-minimum phase properties, permits a rapid and stable control, as well as a device for carrying out the method.

According to the invention, the above is achieved by making the control independent of that power network which entails the above-mentioned difficulties in that actual values for controllers included in the device are formed in dependence on at least one current measurement and at least one voltage measurement in a section between the power networks, as well as a direction-dependent signal processing of these measured values according to the invention. The above-mentioned section is defined such that current and/or voltage generators, which are to be controlled such that their influence on currents and/or voltages occurring in the section or in that power network which causes the above-mentioned difficulties arising in connection with the control, are located in one of the power networks, hereafter called the first power network, and those parts of the power networks which give rise to the above-mentioned difficulties arising in connection with the control are located in the other power network, hereafter called the second power network. By the direction-dependent signal processing, the actual values will become independent of disturbance and impedance conditions in the second power network. Especially, therefore, this power network cannot entail stability problems, and in the case of feedback control, other control performance properties are also not influenced by this power network. Disturbances originating from the second power network are not included in the actual values and cannot, therefore, be cancelled. These circumstances indicate that the actual values are direction-dependent.

Because of the above-mentioned direction dependence, feedback control can be achieved only if the controllable network elements are located in the first power network, and the parameter setting of the controllers as well as the distribution of control action to any additional controllable network elements become dependent only on this power network.

In the case of feedback, the invention can be used generally in power networks to isolate different types of interference, originating from controllers, in different parts of a power network from each other. In this way, the control systems for these different parts can be designed independently of each other.

In the case of feedback control, the actual values can be utilized to reduce the influence of non-minimum phase properties in the transfer function of the network but also to reduce the influence from those parts of the network whose dynamic properties are changing in time, for example by switchings, or otherwise have complicated dynamics. In particular, it is important to reduce the influence from the dynamics of output power lines, which exhibit both delay effects and dynamics variable in time.

A feed-forward control or open-loop control is obtained if the controllable network elements are located in the second power network. In this case, no feedback is obtained to the controllers via the actual values as a result of control interference. This means that instability cannot arise caused by feedback.

In the case of feed-forward control, the actual values can be utilized as input quantities for calculations in calculating models. The multiple measurements of current and voltage can also be utilized to reconstruct, by calculations, stiff voltage sources for the purpose of avoiding non-desirable feedbacks, that is, effects through the feedforward control of the power network by feedback via the current and voltage measurements on which the feed-forward control is based.

The actual values can be utilized to control specific disturbance modes in a power network. An example of such an application is cancellation of electrical disturbances which propagate as an electromagnetic wave in space between, on the one hand, a power line consisting of a number of electric conductors viewed as one unit and, on the other hand, ground along the power line.

The device for forming actual values comprises an implicit or explicit model of the first power network but contains no information about the second power network.

One criterion for the control may, for example, be to reduce disturbances such as harmonic currents or harmonic voltages, generated by a disturbance source included in one of the power networks or connected thereto, which disturbances are transferred to the other power network. For example, one of the power networks may be part of a plant for transmission of high-voltage direct current and comprise a convertor, generating harmonic voltages or harmonic currents which are transmitted to the other power network via d.c. or a.c. lines. Other fields of application of the invention are, for example, cases where one of the networks constitutes at least part of a power supply for electric drive systems and comprises convertors or other commutating circuits, generating harmonic currents and/or voltages which are transmitted to a supply power network. Such a power network may, for example, be part of a drive system for electric traction. Still other fields of application are, for example, such where one of the power networks comprises an electric generator for power generation.

Further characteristics of the invention will be clear from the appended claims.

Advantageous further developments of the invention will be clear from the following description and claims.

BRIEF DESCRIPTION OF THE DRAWINGS

The invention will be explained in greater detail by describing embodiments with reference to the accompanying drawings, wherein.

DESCRIPTION OF THE PREFERRED EMBODIMENTS

The following description relates to the method as well as to the device.

The following is a list of certain designations, used in the following description:

IL(k) the k'th of in total NIL line currents sensed in the section B—B,

IC(m) the m'th of in total NIC mesh currents flowing through the section B—B,

I(m) common designation of the m'th of the line currents IL(k) and the mesh currents IC(m), respectively, in total NI, V(j) the j'th of in total NV node voltages occurring at the section B—B, E(n) the n'th of in total NE driving voltages occurring at the section B—B, U(n) common designation of the n'th of the node voltages V(j) and the driving voltages E(n), respectively, in total NU BM(D) the p'th of in total NBM base modes, M(q) the q'th of in total NM modes, DM(q) a controller signal belonging to the q'th mode M(q), SDM(q,r) the q'th controller signal DM(q) filtered with a filter function SF(q,r)

SM(q,r) the q'th mode M(q) filtered with a filter function SF*(q,r),

SSM(r) the r'th of the filtered modes SM(q,r) summated over the total number of modes NM, C(r) den r'th of in total NC control signals.

In figures, which in connection with the description of embodiments show various filters and signals, general running indexes are generally stated for these, but in certain detailed figures, in order to clarify the description of the invention, there are also often stated for filters and signals their specific indexes. Exemplifications of embodiments of filters and models are normally given by three input variables and three output variables, but it is to be understood that this is only an example and that the invention can be carried out with other numbers of input and output variables and that, depending on the application, the transfer functions of certain filters upon calculation may take the value zero, which indicates that the filter in question is to be excluded.

Figure 1:
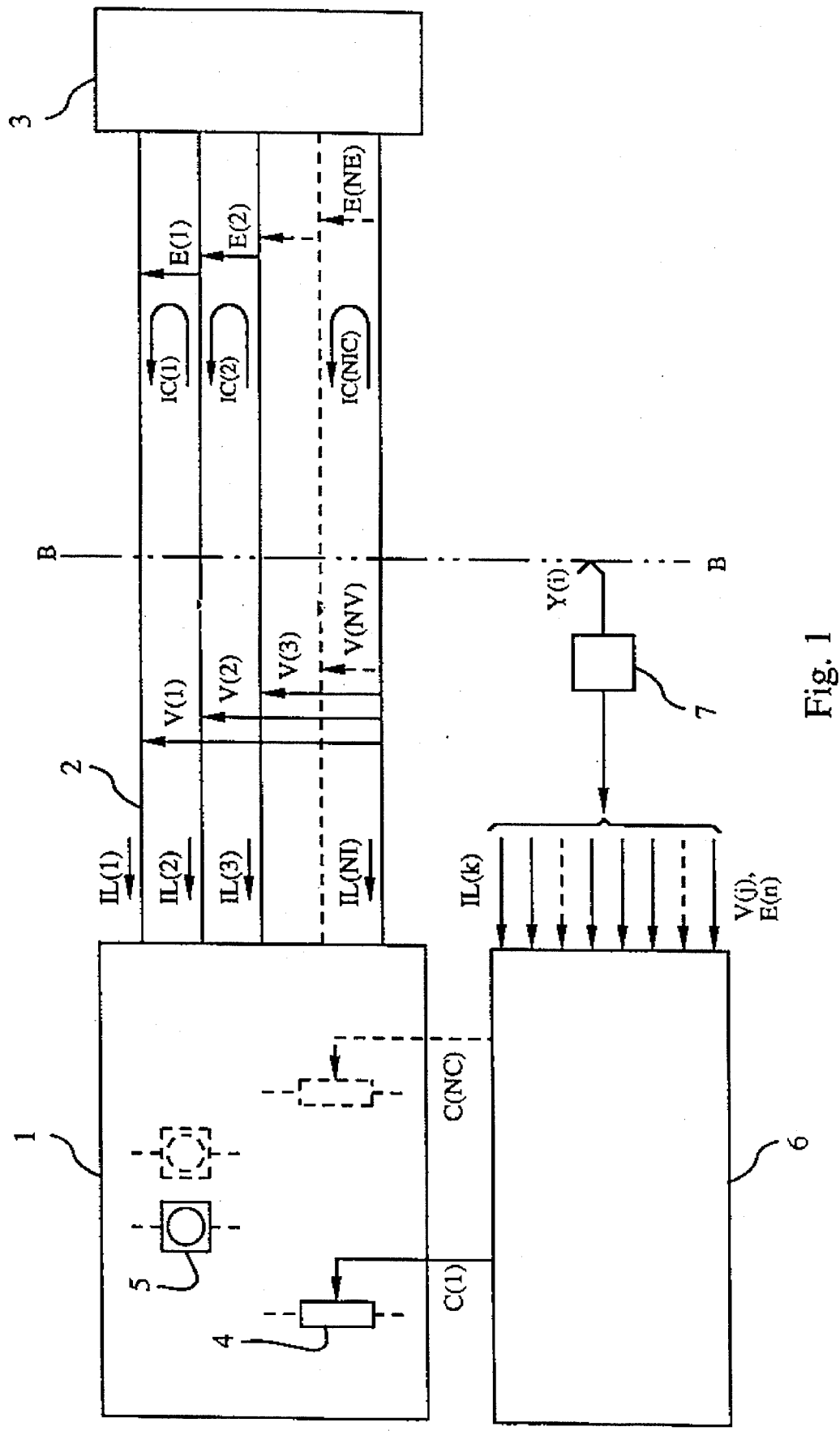
FIG. 1 shows a first and a second power network interconnected by a number of conductors, as well as a control member according to the invention, which is adapted to influence the first power network, FIG. 2a schematically shows an embodiment of a control member according to the invention, FIG. 2b schematically shows another embodiment of parts of a control member according to the invention.

FIG. 1 shows a first power network 1, which by means of L electric conductors 2, where L is greater than or equal to 2, is connected to a second power network 3. The first power network comprises at least one controllable network element 4 and at least one current and/or voltage generator 5 with an internal impedance associated with the generator. A network element 4 may, for example, consist of an active filter, generating a voltage or current which is supplied to the first power network, or of a controllable impedance in the first power network. In the figure, for the sake of clarity, only one of the conductors 2 and only one network element 4 and only one current and/or voltage generator 5 are provided with reference numerals, but it is to be understood that configurations similar to the designated ones are to symbolize elements of the same kind. At least one of the network elements is supplied with a control signal C(r), generated by a control member 6, the voltage or current generated by the network element, or the impedance it exhibits, being dependent on the supplied control signal. The current and/or voltage generators 5 may, for example, consist of a convertor but also of a disturbance inductively or capacitively coupled to the first power network, which disturbance will then be regarded as a disturbance current or disturbance voltage generator provided in the network. It is assumed for the first power network that the principle of superposition can be applied for summation of the currents and voltages, respectively, which are generated in the power network as a result of interference from the network elements, at least around the working point at which the power network is situated prior to such interference. The impedances and current and/or voltage sources of the second power network may be unknown and/or variable, for example as a result of switchings made within the second power network.

Dashed lines and configurations in FIG. 1 designate that the number of these may be greater or smaller than the shown. To the extent that the number has to be stated in the following, it is assumed that the number of controllable network elements amounts to NC such elements and the number of current and/or voltage generators amounts to NG such generators.

A section B—B is conceived to intersect the conductors 2 such that the first and second power networks will be located on different sides of the section, and in the section there are sensed in a manner known per se, by means of a measuring device 7, at least one line current IL(k) flowing through the section in any of the conductors, and at least one voltage occurring at the section. The voltages may thereby be sensed and the measuring device be arranged in a way, known per se, such that the measuring device forms either a value of the voltage V(j) of the respective conductor, relative to a common reference level, at a selected conductor, whereby the voltage V(j) will hereafter be called a node voltage, or alternatively forms voltage differences E(n) between conductors two by two, whereby a voltage difference E(n) will hereafter be called a driving voltage. The measuring device may also comprise members, arranged in a manner known per se, for suppression of certain predetermined frequency components in the sensed currents and/or voltages, including members for elimination of d.c. components in the sensed values. Via the measuring device 7 the control member 6 is supplied with values of at least one line current IL(k) and at least one node voltage V(j) or driving voltage E(n).

These values supplied to the control member are assumed in the following, where appropriate, to have the above-mentioned predetermined frequency components and/or d.c. components suppressed or eliminated, but to simplify the description the designations line current IL(k), node voltage V(j) and driving voltage E(n), respectively, are used irrespective of whether or not this is the case. In FIG. 1, the sensing of voltages and currents has been marked as a sensing of state variables Y(i), where Y(i) thus is a comprehensive designation of the sensed currents and voltages, of the sectional line B—B, but it is to be understood, of course, that these sensing operations are in reality performed on or at the actual conductors. Also, for the sake of clarity, the different measuring devices utilized in that connection have been brought together in FIG. 1 into one single measuring device marked with the reference numeral 7.

In FIG. 1 there are further denoted at the section B—B a number of mesh currents IC(p) which flow through the section. The number of such mesh currents are designated NIC in the following. According to known electrical circuit theory, each such mesh current may be calculated as a sum of contributions from each one of the current and voltage generators located in the networks, whereby when calculating the contribution of each current and voltage generator, all the other voltage generators are conceived to be short-circuited and all the other current generators are conceived to be disconnected from the networks and replaced by their internal impedances. Thus, current and voltage generators in both the first power network 1 and the second power network 2 contribute to the mesh currents IC(p). The contribution of the second network is thereby conceived, as marked in the figure, to be expressed as the voltages E(n) driving the mesh currents.

Considering first the mesh currents IC(p), it can thus be said that the p'th mesh current IC(p) consists of a contribution ICN1(p) from the first power network 1 and a contribution ICN2(p) which is dependent on the second power network 2 as well as the connection of this to the first power network 1 in section B—B. This can be expressed, by way of equation, as follows:

$$IC(p) = ICN1(p) + ICN2(p) = ICN1(p) + \sum_{n=1}^{NE} A(p,n)*E(n) \quad (1a)$$

where A(p,n) is a transfer function with the dimension admittance which expresses the dependence of the p'th mesh current IC(p) on the n'th driving voltage E(n).

Considering, instead, the driving voltages E(n), it can be said in an analogous manner that the n'th driving voltage E(n) consists of a contribution EN1(n) from the first power network 1 and a contribution EN2(n) which depends on the second power network 2 as well as the connection of this to the first power network 1 in section B—B. This can be expressed, by way of equation, as follows:

$$E(p) = EN1(p) + EN2(p) = EN1(p) + \sum_{m=1}^{NIC} B(p,m)*IC(m) \quad (1b)$$

where formally the running index n has been replaced by a running index p and where B(p,m) is a transfer function with the dimension impedance which expresses the dependence of the p'th driving voltage E(p) on the m'th mesh current IC(m).

Considering the line currents IL(k) flowing through the conductors, it can be said in an analogous manner that the k'th line current IL(k) consists of a contribution ILN1(k) from the first power network 1 and a contribution ILN2(k) which depends on the second power network 2 as well as the connection thereof to the first power network 1 in section B—B. This can be expressed, by way of equation, as follows:

$$IL(p) = ILN1(p) + ILN2(p) = ILN1(p) + \sum_{j=1}^{NV} F(p,j)*V(j) \quad (1c)$$

where formally the running index k is replaced by the running index p and where F(p,j) is a transfer function with the dimension admittance which expresses the dependence of the p'th line current IL(p) on the j'th node voltage V(j).

Finally, considering the node voltage V(j), it can be said in an analogous manner that the j'th node voltage V(j) consists of a contribution VN1(j) from the first power network 1 and a contribution VN2(j) which depends on the second power network 2 as well as the connection thereof to the first power network 1 in section B—B. This can be expressed, by way of equation, as follows:

$$V(p) = VN1(p) + VN2(p) = VN1(p) + \sum_{k=1}^{NIL} G(p,k)*IL(k) \quad (1d)$$

where formally the running index n is replaced by the running index p and where G(p,k) is a transfer function with the dimension impedance which expresses the dependence of the p'th node voltage V(p) on the k'th line current IL(k).

By a linear combination of a number of variables there is meant in the following a sum of terms, each term being formed as the product of a variable, multiplied by a weight factor associated with the variable. The weight factor may be a real number but also, for example, a frequency-dependent transfer function. The variables may be expressed in vector form and the weight factors form a matrix, in which case also the linear combination will be expressed in vector form.

The contributions ICN2(p), ILN2(k), EN2(n) and VN2(j) thus consist of linear combinations of voltages E(n) and V(j), respectively, and currents IC(m) and IL(k), respectively, weighted with admittance functions A(p,n) and F(p,j), respectively, and impedance functions B(p,m) and G(p,k), respectively.

It should be noted that the transfer functions A(p,n), B(p,m), F(p,j) and G(p,k) introduced in the equations (1a)...(1d) are unambiguously determined by the configuration of the first power network and it is assumed for the time being that they are known by knowledge of the first power network.

In similar manner, in accordance with known electrical circuit theory, the mesh currents IC(m) can be expressed as linear combinations of measured line currents IL(k), which in equation form may be expressed as follows:

$$IC(m) = \sum_{k=1}^{NIL} KI(m,k)*IL(k) \quad (2)$$

where KI(m,k) designates the coefficients by which line currents are weighed together in the combination referred to, or with other running indexes $$IC(p) = \sum_{k=1}^{NIL} KI(p,k)*IL(k) \quad (2a)$$

One object of the invention is now to form a variable BM(p), hereafter called base mode, which depends on at least one sensed current and at least one sensed voltage, the base mode being independent of the impedance functions of the second power network 2, of disturbance voltages and/or disturbance currents generated in the second power network and of changes in the dynamic properties thereof, caused by, for example, switchings in the second power network.

It is realized from the foregoing that the above-mentioned object of the invention by definition is achieved if the base mode BM(p) is set equal to the contribution ICN1(p) from the first power network 1 to the p'th mesh current IC(D) according to equation (1a), or equal to the contribution EN1(p) from the first power network 1 to the p'th driving voltage E(p) according to equation (1b), or equal to the contribution ILN1(p) from the first power network 1 to the p'th line current IL(p) according to (1c) or equal to the contribution VN1(p) from the first power network 1 to the p'th node voltage V(p) according to equation (1d).

From the respective equations (1a), (1b), (1c) and (1d), the alternative expressions of the base modes BM(p) (which are different among themselves) are then obtained $$BM(p) = IC(p) - \sum_{n=1}^{NE} A(p,n)*E(n) \quad (3a)$$

$$BM(p) = E(p) - \sum_{m=1}^{NIC} B(p,m)*IC(m) \quad (3b)$$

$$BM(p) = IL(p) - \sum_{j=1}^{NV} F(p,j)*V(j) \quad (3c)$$

$$BM(p) = V(p) - \sum_{k=1}^{NIL} G(p,k)*IL(k) \quad (3d)$$

Figure 3:
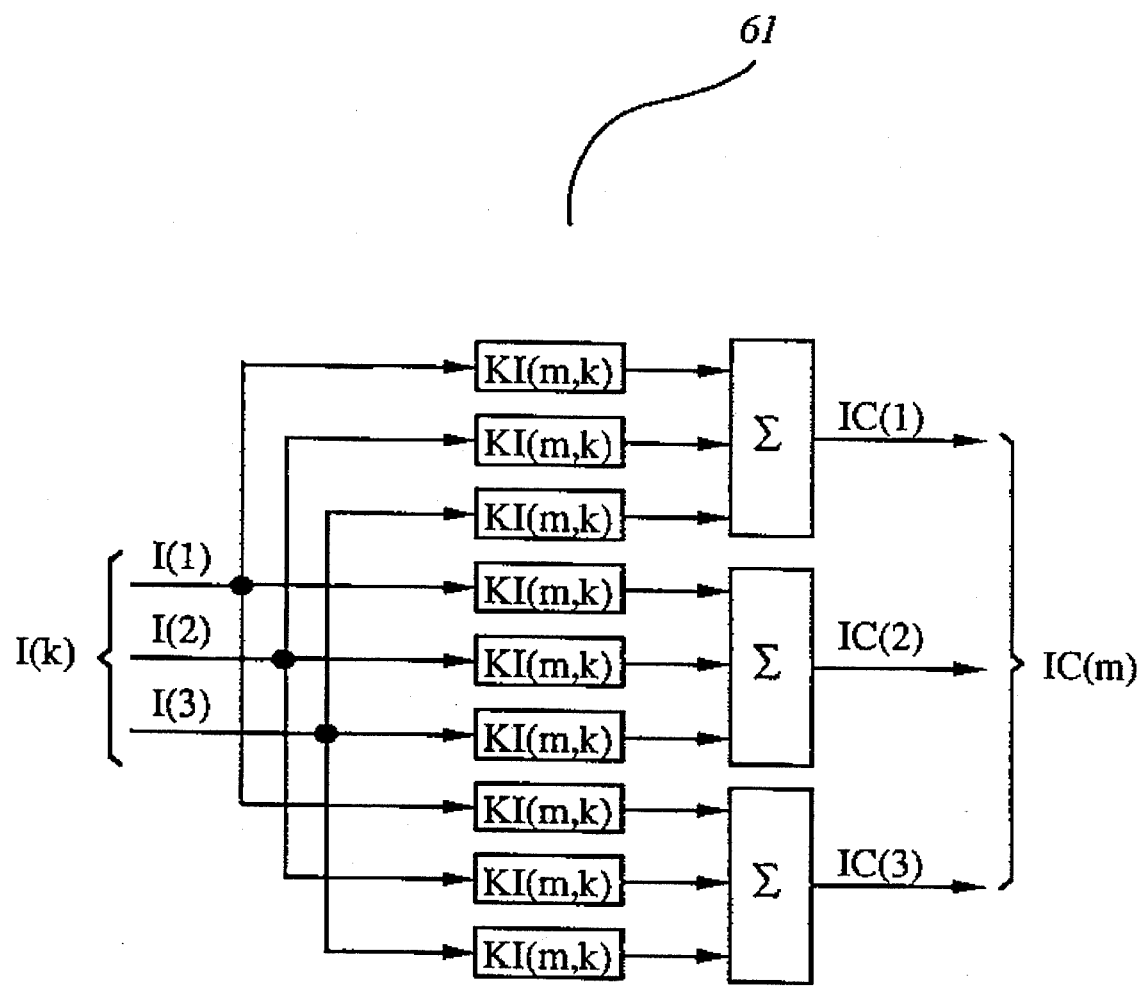
FIG. 3 shows an embodiment of a current combination unit comprised in a control member according to the invention.

The control member 6 is supplied with the values, formed in the measuring device 7, of the line currents IL(k) and the driving voltages E(n) or node voltages V(j). In certain cases, which are to be explained more clearly in the following, the line currents IL(k) are supplied to a current combination unit 61, comprised in the control member and shown in FIGS. 2a and 3, which in a manner known per se performs the linear combination which is expressed in equations (2) and (2a). The mesh currents IC(m) and the driving voltages E(n) or, alternatively, the line currents IL(k) and the node voltages V(j) are supplied to a base mode filter 62 comprised in the control member and shown in FIGS. 2a and 4.

Figure 4:
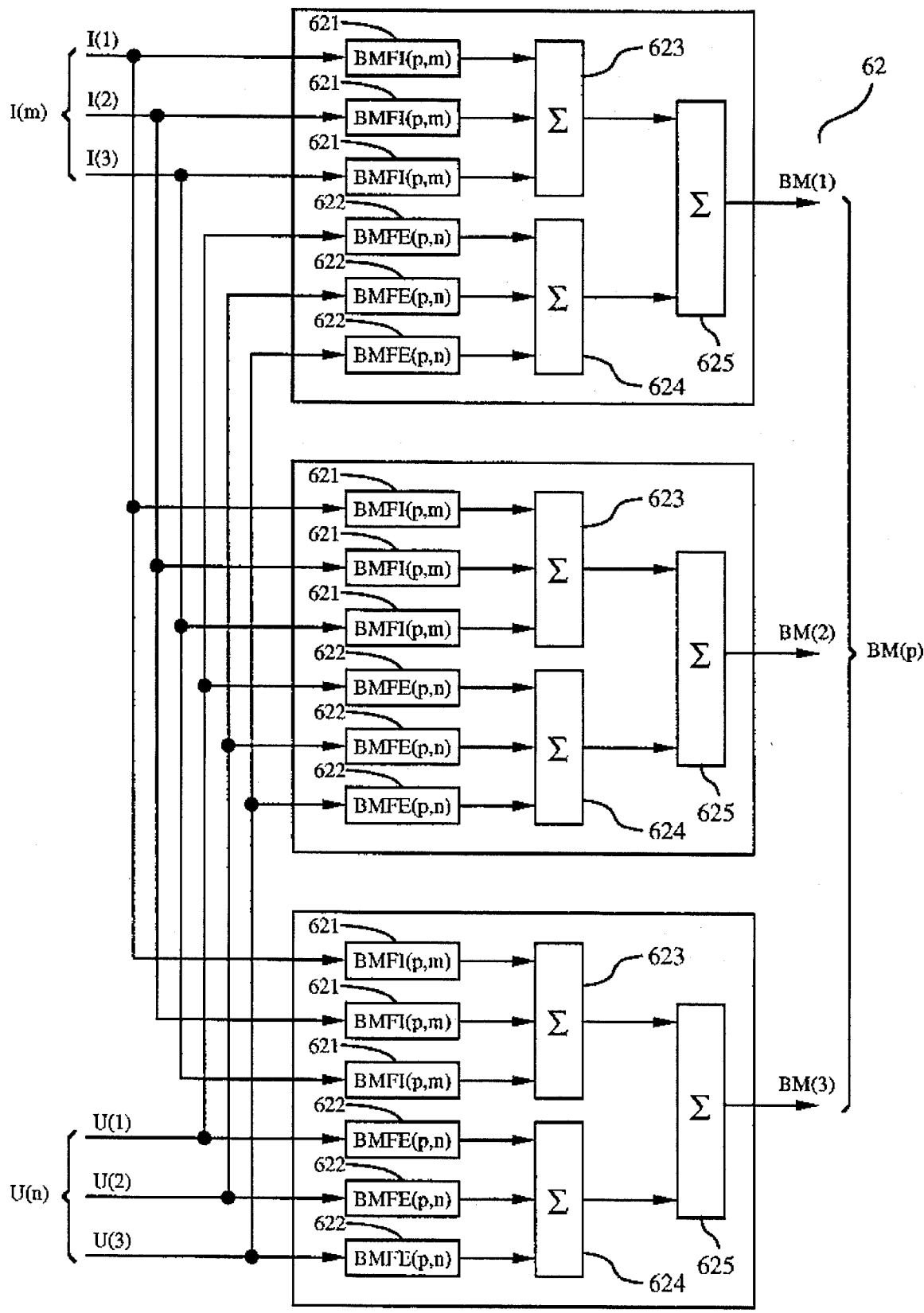
FIG. 4 shows an embodiment of a base mode filter comprised in a control member according to the invention.

The base mode filter according to FIG. 4 comprises current filters 621, the transfer function of which is designated BMFI(p,m), voltage filters 622, the transfer function of which is designated BMFE(p,n), current summators 623, voltage summators 624 and base mode summators 625, and forms, as is clear from FIGS. 2a and 4, of the supplied values I(m) and U(n) one or more linear combinations BM(p) and its function can be expressed in equation form as $$BM(p) = \sum_{m=1}^{NI} BMFI(p,m)*I(m) + \sum_{n=1}^{NU} BMFE(p,n) * U(n) \quad (4)$$

where I(m) has been introduced as a common designation for the mesh current IC(m) or, alternatively, the line current IL(k) and U(n) as a common designation for the driving voltage E(n) or, alternatively, the node voltage V(j). The number NI of the currents I(m) is equal to the respective NIC or NIL and the number NU of the voltages U(n) is equal to the respective NE or NV.

The current and voltage summators have been introduced to clarify the function of the device but they may, of course, as is clear from the figure, be excluded, in which case the current and voltage filters are connected directly to the respective base mode summators.

A set of state variables Y(i) comprising either a full set of mesh currents IC(m) and driving voltages E(n) or, alternatively, a full set of line currents IL(k) and node voltages V(j), and which is supplied to the base mode filter, unambiguously define the state in the section B—B. However, it should be noted that in the event that only certain of the state variables Y(i) in section B—B are to be controlled, there is no requirement for an unambiguous determination of all the state variables. Such incomplete state determinations will be defined and described below in connection with the introduction of the concept mode. In such cases, there is no requirement for measurement of a full set of mesh currents IC(m) and driving voltages E(n), or a full set of line currents IL(k) and node voltages V(j).

A comparison, term-by-term, between, on the one hand, equations (3a), (3b), (3c) and (3d) and, on the other hand, equation (4) now shows in order that identity shall prevail obtained from equation (3a);

$$BMFI(p,m) = \begin{cases} 1 & \text{if } p = m \\ 0 & \text{if } p \neq m \end{cases} \quad (5a)$$

$$BMFE(p,n) = -A(p,n) \quad (6a)$$

from equation (3b);

$$BMFE(p,n) = \begin{cases} 1 & \text{if } p = n \\ 0 & \text{if } p \neq n \end{cases} \quad (5b)$$

$$BMFI(p,m) = -B(p,m) \quad (6b)$$

from equation (3c);

$$BMFI(p,m) = \begin{cases} 1 & \text{if } p = m \\ 0 & \text{if } p \neq m \end{cases} \quad (5c)$$

$$BMFE(p,n) = -F(p,j) \quad (6c)$$

and from equation (3d);

$$BMFE(p,n) = \begin{cases} 1 & \text{if } p = n \\ 0 & \text{if } p \neq n \end{cases} \quad (5d)$$

$$BMFI(p,m) = -G(p,k) \quad (6d)$$

The above-mentioned object of the invention is thus achieved by selecting the transfer functions BMFI(p,m) and BMFE(p,n) for the current filters 621 and the voltage filters 622, respectively, in the base mode filter in accordance with equations (5a) . . . (5d) and (6a) . . . (6d) above, in that the equations (3a) . . . (3d) and the assumptions for these are thereby fulfilled. Equation (4), expressed for the case where the base mode BM(p) is set equal to the contribution ICN1(p) from the first power network 1 to the p'th mesh current IC(p) according to equations (1a) and (3a), is then obtained with equations (5a) and (6a) inserted $$BM(p) = IC(p) + \sum_{n=1}^{NE} BMFE(p,n)*E(n) \quad (7a)$$

and with IC(p) according to equation (2a)

$$BM(p) = \sum_{k=1}^{NIL} KI(p,k)*IL(k) + \sum_{n=1}^{NE} BMFE(p,n) * E(n) \quad (8a)$$

where the line currents IL(k) and the driving voltages E(n) are thus supplied to the base mode filter from the measuring device 7. In this case, the base mode BM(p) can be regarded as a current.

In the same way, expressions for BM(p) can be obtained based on the other assumptions above.

With the assumption according to equation (3b), the following is obtained $$BM(p) = E(p) + \sum_{m=1}^{NIC} BMFI(p,m)*IC(m) \quad (7b)$$

and with IC(m) according to equation (2)

$$BM(p) = E(p) + \sum_{m=1}^{NIC} BMFI(p,m)* \sum_{k=1}^{NIL} KI(m,k)*IL(k) \quad (8b)$$

where the driving voltage E(p) and the line currents IL(k) are supplied to the base mode filter from the measuring device 7. In this case the base mode BM(p) can be regarded as a voltage.

With the assumption according to equation (3c) the following is obtained:

$$BM(p) = IL(p) + \sum_{j=1}^{NV} BMFE(p,j) * V(j) \quad (7c)$$

where the line current IL(p) and the node voltage V(j) are supplied to the base mode filter from the measuring device 7. In this case, the base mode BM(p) can be regarded as a current.

With the assumption according to equation (3d), the following is obtained:

$$BM(p) = V(p) + \sum_{k=1}^{NIL} BMFI(p,k) * IL(k) \quad (7d)$$

where the node voltage V(j) and the line currents IL(k) are supplied to the base mode filter from the measuring device 7. In this case, the base mode BM(p) can be regarded as a voltage.

FIGS. 11a–11d schematically show how the base mode BM(p) is formed according to equations (8a), (8b), (7c) and (7d) and with the relationships (5a) . . . (5d) and (6a) . . . (6d) inserted, respectively.

The base mode filter as shown in FIG. 4 thus constitutes an implementation of the general assumption according to equation (4) but as is clear from the expressions (5a) . . . (5d) and (6a) . . . (6d), the transfer functions for certain current and voltage filters assume the value one or zero, the value zero indicating that the filter in question can be excluded.

Figure 5:
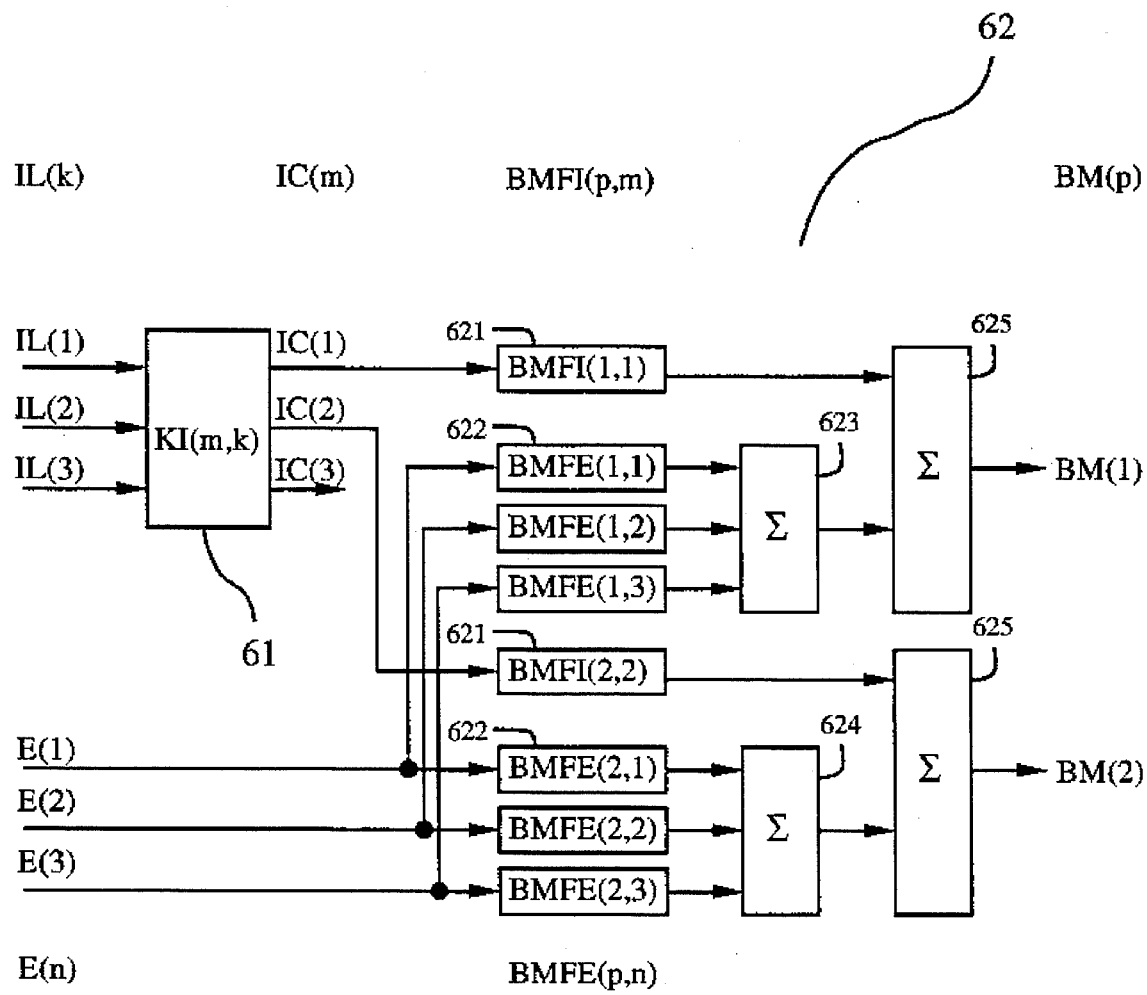
FIG. 5 shows a special embodiment of a base mode filter according to FIG. 4.

An embodiment of the base mode filter according to equation (8a) is shown in FIG. 5 for the cases p=1 and P=2 with k=1, 2, 3 and n=1, 2, 3. In this case, the filter functions BMFI(1,1) and BMFI(2,2) both have the value one, whereas the filter functions BMFE(p,n) are calculated from equation (6a). The third mesh current IC(3) is not used, in this case, for the formation of the base modes BM(1) and BM(2).

Another object of the invention is now to form from the base modes BM(p) a variable M(q), hereafter called mode, for the purpose of selecting certain currents and voltages for control of the first power network in such a way that the influence of the first power network on these currents and voltages fulfils certain predetermined criteria for its influence on the second power network.

In a preferred embodiment, the base modes BM(p) are supplied to a mode generator 63, comprised in the control member and shown in FIGS. 2a, 2b and 6a, 6b. The mode generator comprises mode filters 631, the transfer functions of which are designated MF(q,p), and mode summators 632 for summing up the base modes from which a mode is to be formed. As is clear from these figures, the mode generator forms from the base modes BM(p) one or more linear combinations M(q) and its function can be expressed in equation form as $$M(q) = \sum_{p=1}^{NBM} MF(q,p)*BM(p) \quad (9)$$

Thus, the mode M(q) is dependent on contributions from the first power network 1 and on the filter functions which are introduced independently of the second power network. This results in also the mode M(q) being independent of impedance functions, dynamic system properties, switchings and of disturbances associated with the second power network 2. All information about these facts is filtered out in the base mode filter by the current filters 621 and the voltage filters 622, which have the transfer functions included in the righthand term of equations (7a) . . . (7d). A controller which is supplied with the mode M(q) as actual value for comparison with a desired value RM(q) of the mode M(q), and whose output signal controls one or more network elements in the first power network 1, will thus not be influenced by the second power network 2. The control becomes direction-dependent from the first power network 1 towards the section B—B, and disturbances generated by the second power network 3 and which occur in section B—B will not be considered since they are filtered out when forming the base modes.

Figure 6A:
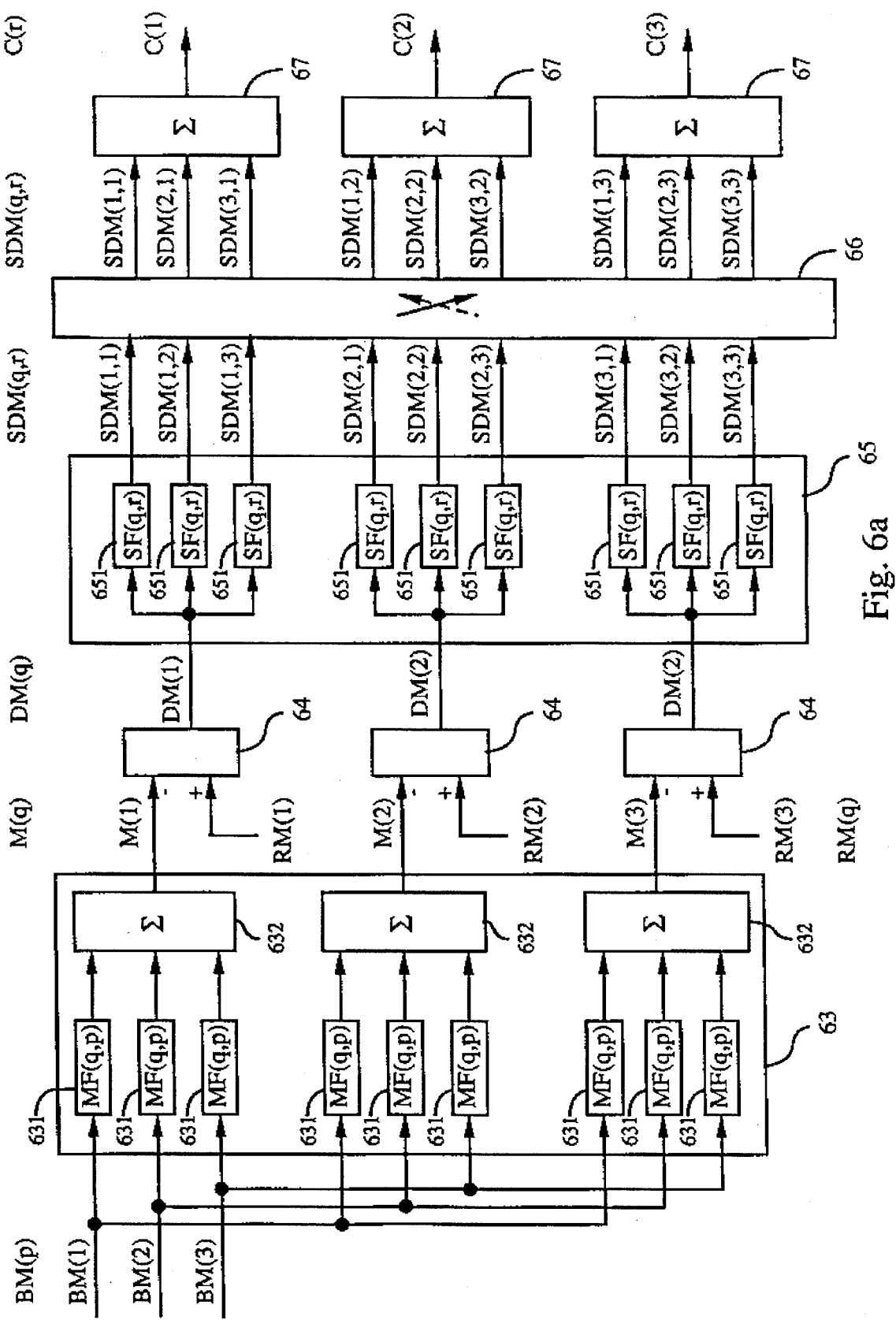
FIG. 6a shows an embodiment of mode filters, controllers, control distributors, multiplexor and summator units comprised in a control member in the embodiment according to FIG. 2a, FIG. 6b shows an embodiment of mode filters, controllers, control distributors, multiplexor and summator units comprised in a control member in the embodiment according to FIG. 2b.

The control of the controllable network elements is achieved by each one of the modes M(q) being supplied to a controller, comprised in the control member and belonging to the respective mode, shown in FIGS. 2a and 6a. In the latter figure, all the controllers have been marked with the reference numeral 64, although it is to be understood that in this embodiment each mode to be controlled is associated with its own controller. In each one of the controllers, the mode M(q) is compared with a desired reference value RM(q) for the respective mode. In some way, known per se, for example in dependence on the deviation between the value of the mode and its reference value, the controller generates an output signal which is denoted as the controller signal DM(q) associated with the q'th mode, and the control member generates a control signal C(r) in dependence on the controller signal(s) DM(q), which control signal is supplied to the r'th network element in the first power network. The network element thereby causes an interference in the first power network which strives to control the mode M(q) to the desired reference value RM(q). In the event that the number of controllable network elements in the first power network is greater than one, in a preferred embodiment more than one mode may be formed from the base modes and also the controller signals DM(q) may be distributed, according to a desired control law, among each one of the control signals C(r) which are supplied to the respective network element. The distribution of the controller signals DM(q) is achieved by means of a control distributor 65 belonging to each of the modes, a multiplexor 66, and a summator unit 67 belonging to each of the control signals C(r), all of these being shown in FIGS. 2a, 2b, 6a, 6b and 7. In the embodiment according to FIGS. 2a and 6a, the control distributor comprises distributor filters 651, the transfer function of which is designated SF(q,r), and distributes the supplied controller signal DM(q) on, at most, NC outputs, where NC is the number of control signals C(r) generated by the control member. The above-mentioned control law may, for example, be formed in such a way that the interference from the network elements, which is dependent on the control signals, at least with a weakened effect influences the other currents and voltages in the section B—B. It may also be formed to compensate for different dynamic transfer functions between a mode and separate control signals.

The output signals from the control distributor are called controller distributing signals and are designated SDM(q,r), and for each of the output signals SDM(q,r), as is clear from the above-mentioned figures, the following relationship applies:

$$SDM(q,r) = \sum_{q=1}^{NM} SF(q,r) * DM(q) \quad (10)$$

where the transfer function SF(q,r) may be a constant or comprise a frequency dependence. The task of the multiplexor is to distribute the controller distributing signals SDM(q,r) from the control distributor and supply these to the r'th summator unit 67 in such a way that contributions from different modes M(q) are summed over the running index q to form the control signal C(r).

Thus, in this case the control signal C(r) consists of a sum of the controller signals DM(q), each one weighted with the transfer function SF(q,r). An embodiment of the multiplexor in the case of three modes and three control signals is shown in detail in FIG. 7.

Figure 6B:
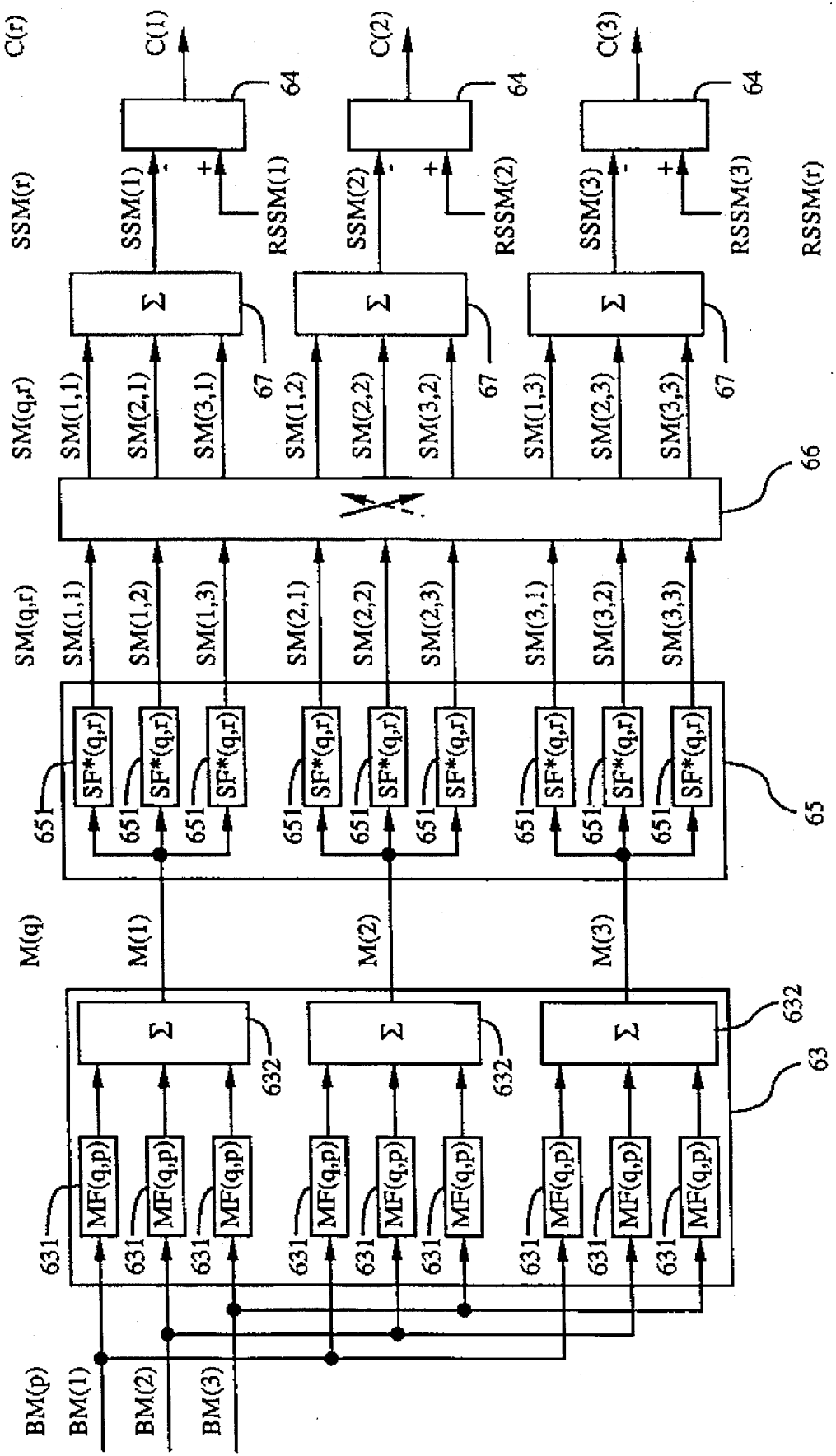
Figure 7:
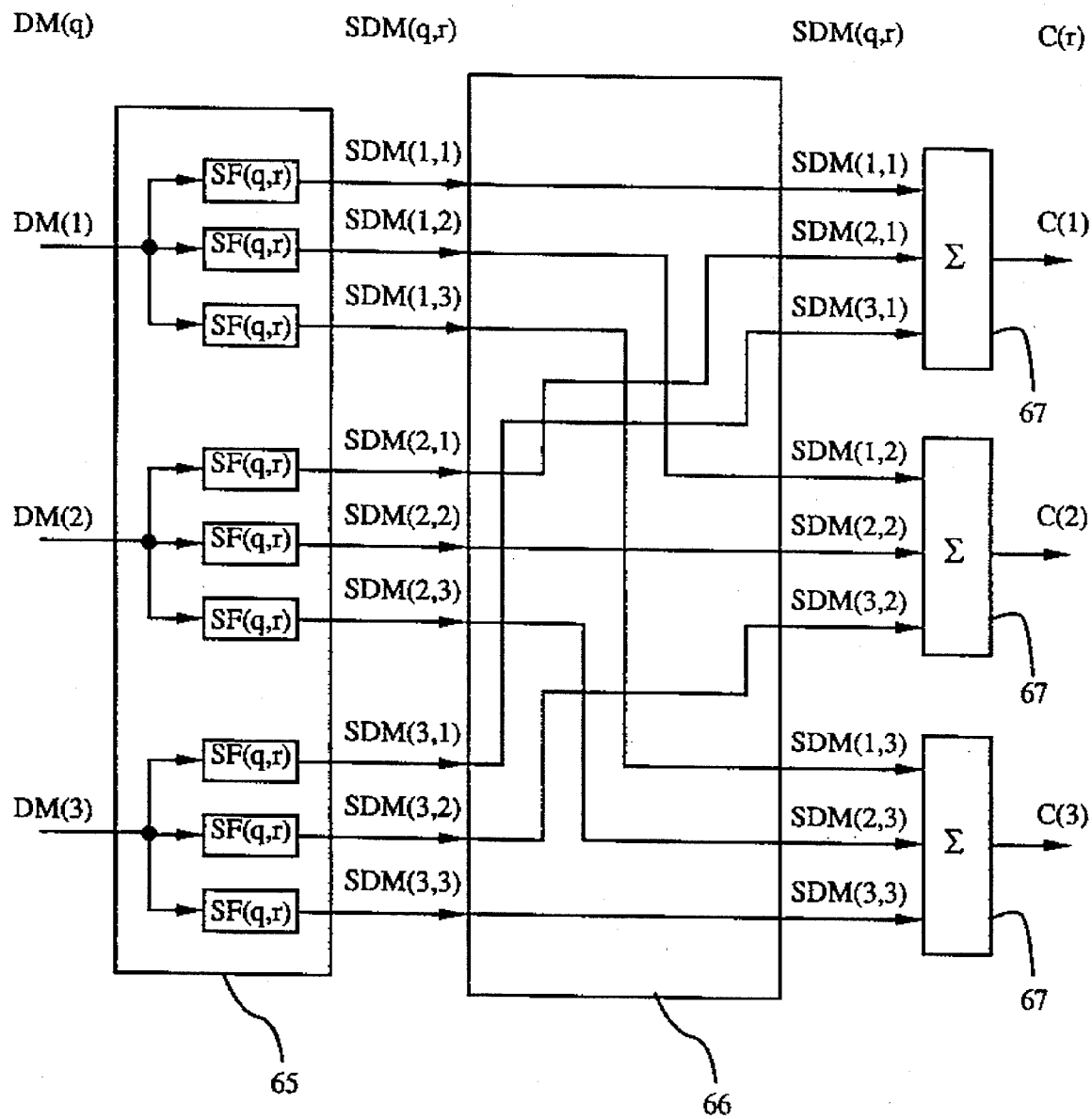
FIG. 7 shows an embodiment of a multiplexor according to FIG. 6a or 6b, FIGS. 8a–8c show different embodiments of a base mode filter according to the invention, comprising a model of the first power network, FIG. 9a schematically shows a 2-pole HVDC station with active filters at both poles and a control member according to the invention.

In another preferred embodiment, shown in FIGS. 2b and 6b, the modes M(q) are supplied to the control distributor 65, which thus in this case distributes the supplied mode M(q) on at most NC outputs, where NC is the number of control signals C(r), generated by the control member. The output signals from the control distributor are referred to in this embodiment as mode distributing signals and are designated SM(q,r), and for each one of the mode distributing signals SM(q,r) the following relationship applies:

$$SM(q,r) = \sum_{q=1}^{NM} SF^*(q,r) * M(q) \quad (11)$$

where SF*(q,r) is the transfer function of the distributor filters, which may be constant or comprise a frequency dependence. In this embodiment, the task of the multiplexor is to distribute the mode distributing signals SM(q,r) from the control distributor and supply these to the r'th summator unit 67 in such a way that contributions from different modes M(q) are summed over the running index q to form a mode sum SSM(r). The mode sum SSM(r) is then supplied to the controller 64, in which the mode sum SSM(r) is compared with a desired reference value RSSM(r) for the respective mode sum. In a way, known per se, for example in dependence on the deviation between the value of the mode sum and its reference value, the controller generates a control signal C(r), which is supplied to the r'th network element in the first power network. The network element thereby achieves an interference in the first power network which strives to control the mode sum SSM(r) to the desired reference value RSSM(r).

The transfer functions MF(q,p) for the mode filters comprised in the mode generator may preferably consist of constants, but by forming them with frequency-dependent properties, the control of separate currents and voltages in the section B—B may, for example, be formed with different dynamic properties.

Certain of the transfer functions for the mode and distributor filters shown in the FIGS. 6a–6b may, depending on the application, assume the value one or zero, whereby the value zero indicates that the filter in question can be excluded.

In the event that only one base mode is formed, only one mode can be formed which in the simplest case is set equal to the base mode. If, in such a case, the number of controllable network elements is greater than one, the mode is supplied to the control distributor for forming the desired number of controller and mode distributing signals, respectively. Control signals are then generated in the way described above, with the difference that the requirement for multiplexor and summator units is eliminated.

In an advantageous embodiment, the control member 6 can be adapted to comprise a model of the first power network 1 which then essentially replaces the base mode filter described above. This embodiment, which is to be described with reference to FIGS. (8a) . . . (8c), permits a determination of the base modes BM(p) according to equations (3a) . . . (3d) without analytical expressions for the transfer functions A(p,n), B(p,m), F(p,j) and G(p,k), introduced in equations (1a) . . . (1d), having to be known.

Figure 8A:
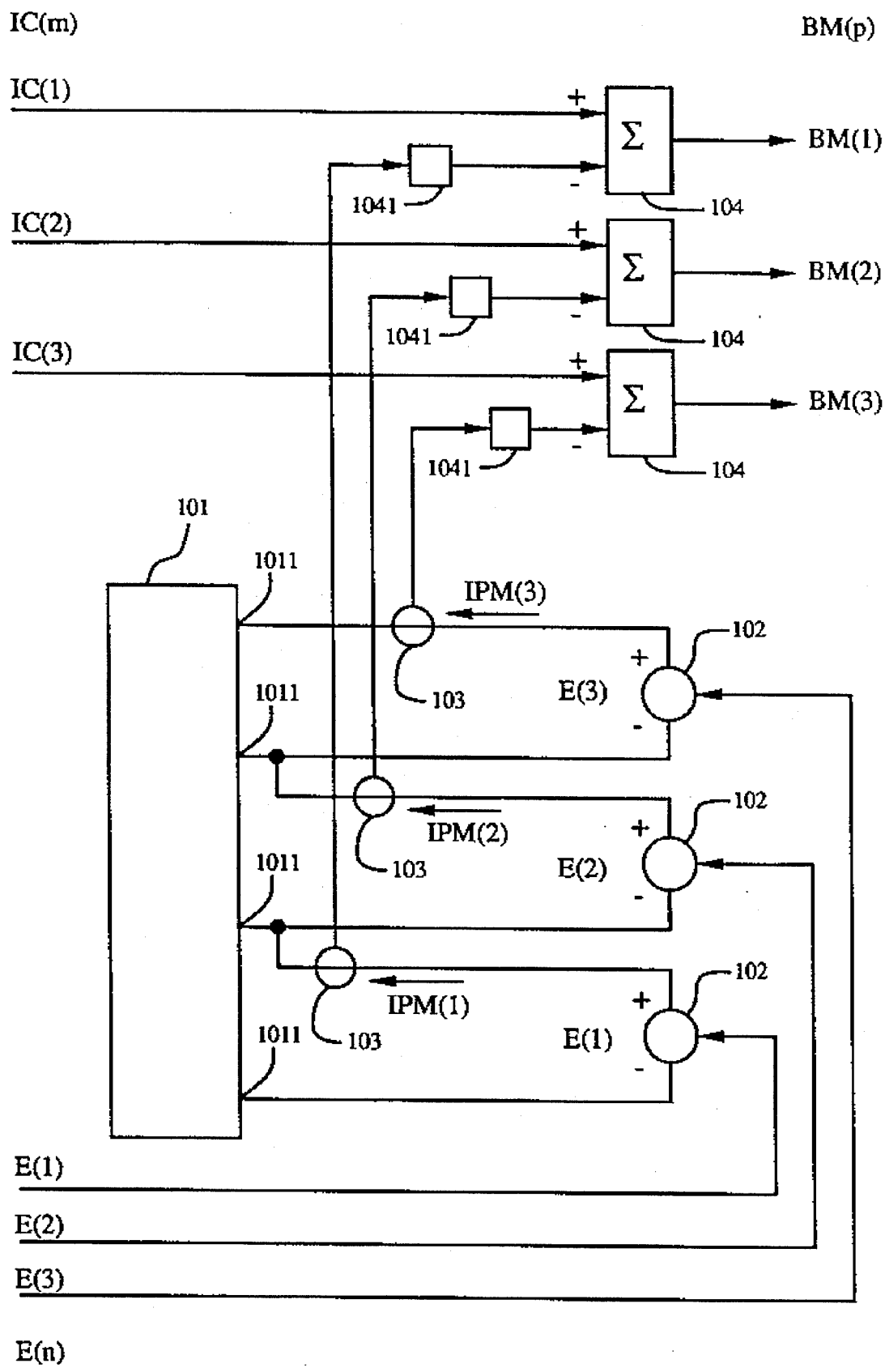

FIGS. (8a) . . . (8c) show a model 101 of the first power network in which all the voltage sources 5 are conceived to be short-circuited and all the current generators 5 conceived to be disconnected from the network such that these generators in the model are only represented by their internal impedances associated with the respective generator. The model has connection points 1011 which correspond to the points in the actual power network at which the conductors 2 are connected to the first power network. In the embodiment illustrated in FIG. 8a, the model is supplied with values of the driving voltages E(n), which is illustrated by the controllable signal generators 102, which thus generate voltages in dependence on the driving voltages E(n). The output signals of the signal generators are supplied to the model between the outputs which in the model correspond to the points in the actual power network at which the conductors 2 are connected to the first power network and between which the respective driving voltage occurs. In response to the supplied output signals from the signal generators, the model will thereby generate values of currents IPM(n) which are conceived to flow through the signal generators. These currents are sensed by means of current measuring devices 103 and are supplied, possibly after multiplication by a constant in the multiplier unit 1041, with negative sign, to a summator 104 associated with each current measuring device. A second input on the respective summator is supplied with a value of the corresponding mesh current IC(m), with positive sign, which value is obtained via the measuring device 7. From a comparison with equation (3a) it is realized that the output signal from the respective summator consists of the desired base mode BM(p) in that the current IPM(p) measured in the model by definition corresponds to the sum $$\sum_{n=1}^{NE} A(p,n)*E(n))$$

in equation (3b) and the summation is performed as the mesh voltages E(n) are supplied to the model simultaneously. Thus, in this particular case, the current IPM(2) indicated in FIG. 8a corresponds to the sum $$\sum_{n=1}^{3} A(2,n)*E(n).$$

Figure 8B:
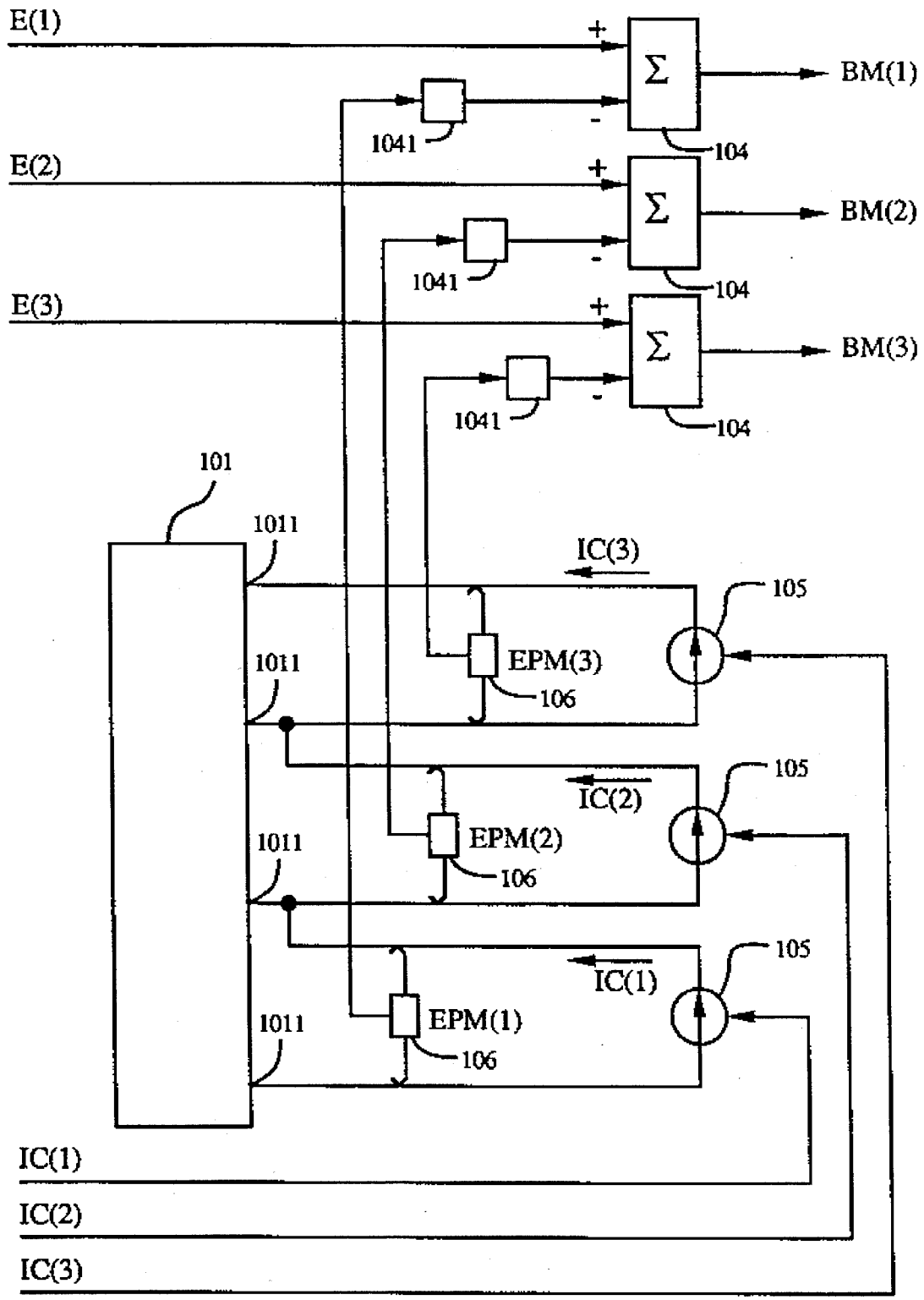

An analogous method can be used when base modes of voltage character according to equations (3b) are to be formed. This is illustrated in FIG. 8b, which differs from FIG. 8a in that the signal generators consist of controllable current generators 105, which generate currents in dependence on the mesh currents IC(m), whereby the response of the model in the form of voltages EPM(p) between the connection points is sensed by means of voltage measuring devices 106 and is supplied, possibly after multiplication by a constant in multipliers 1041, with negative sign to a summator 104 associated with each voltage measuring device. The second input of the respective summator is supplied with a value of the corresponding driving voltage E(n), with positive sign, obtained from the measuring device 7. From a comparison with equation (3b), it is realized that the output signal from the respective summator consists of the desired base mode BM(p) in that the voltage EPM(p) measured in the model by definition corresponds to the sum $$\sum_{m=1}^{NIC} B(p,m)*IC(m)$$

in equation (3b) and the summation is performed as the mesh currents IC(m) are supplied to the model simultaneously.

Figure 8C:
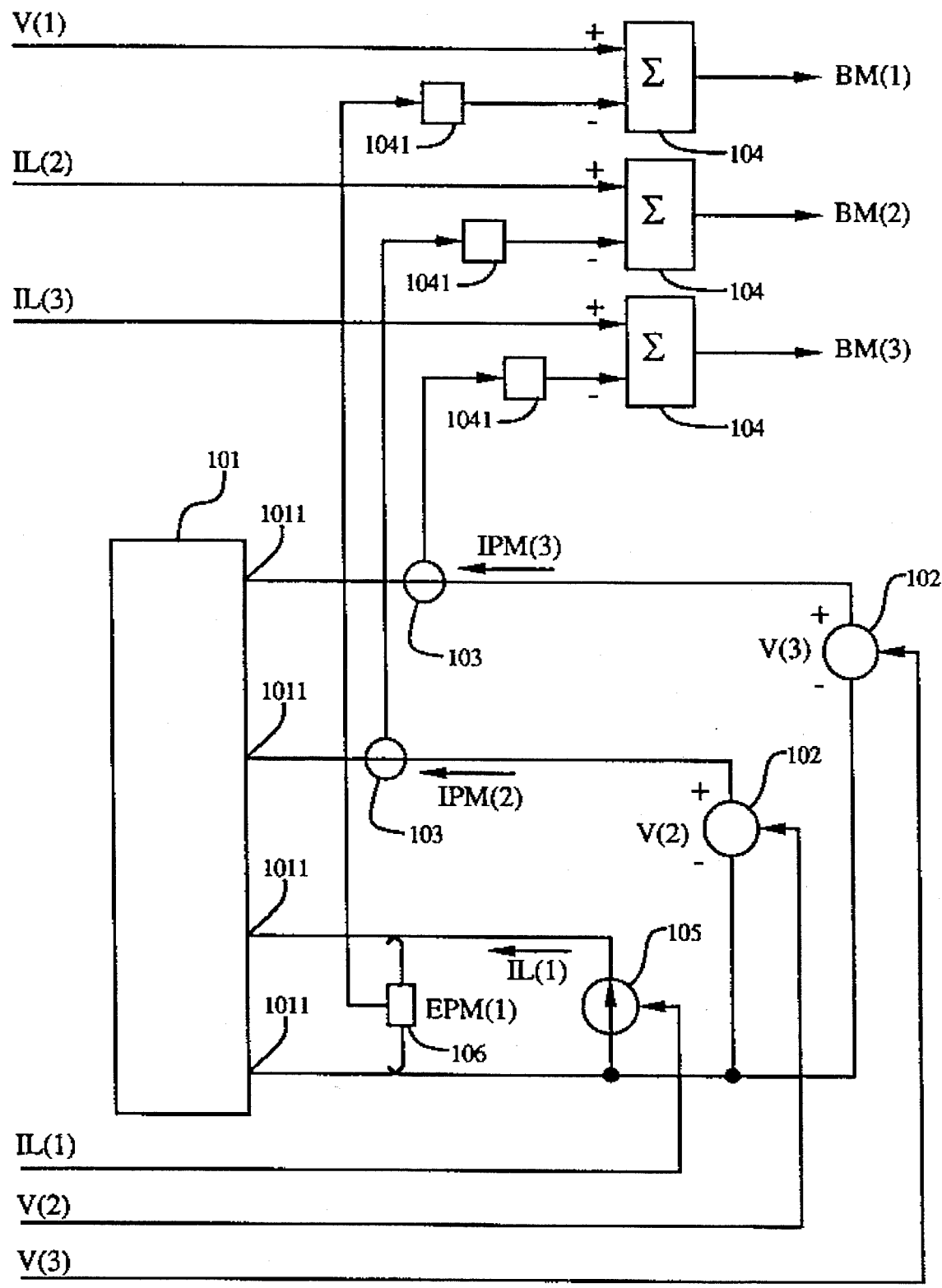

It is not necessary that all base modes BM(p) are formed based on only one of the assumptions which form the basis of equations (3a) . . . (3c). In certain cases, it may be desirable, for example, to give two base modes current character and one base mode voltage character. Such a case is illustrated in FIG. 8c where the base mode BM(1) is formed based on equation (3d) whereas base modes BM(2) and BM(3) are formed based on equation (3c). The base modes are formed starting from sensed values of the line current IL(1) and the node voltages V(2) and V(3). The two node voltages V(2) and V(3) are connected to a reference level which is common to the model and corresponds to a common reference level in section B—B.

The model 101 can be designed as a physical network model but also be implemented as software in a computer. In this case, the measured values received from the current measuring devices 103 and the voltage measuring devices 106, respectively, are replaced by calculated results of corresponding values.

This alternative embodiment of the base mode filter thus means that the calculations of the current filters BFMI(p,m) and BFME(p,n), which are carried out in the previously described embodiment, are replaced by values obtained from the model.

Figure 9A:
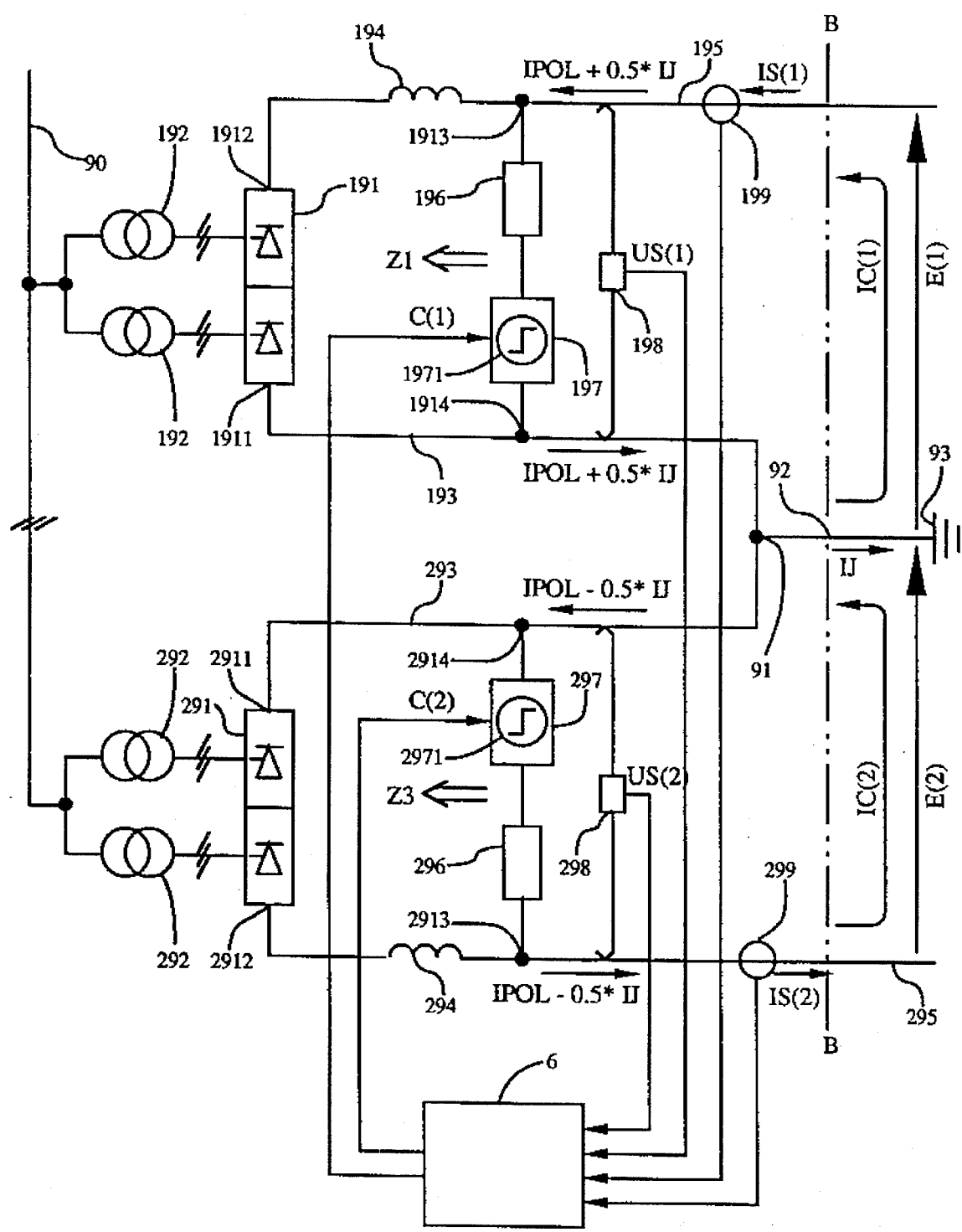
FIG. 9b shows a model for forming base modes according to FIG. 8a in the HVDC station according to FIG. 9a, FIG. 9c shows an embodiment of a control distributor according to FIG. 6a in the HVDC station according to FIG. 9a, FIG. 10a shows a first and a second power network interconnected by two conductors as well as a control member according to the invention.

An application of the invention to plants for transmission of high-voltage direct current (HVDC) will be described in the following with reference to FIG. 9a. It is known that the converters included in such plants by their mode of operation generate harmonics to the fundamental tone of the supply a.c. network. To counteract the propagation of these harmonics along a.c. lines and d.c. lines connected to the convertors, extensive passive filters are usually installed, which, however, generally do not completely eliminate the harmonics. The harmonics give rise to extra stresses on components included in the power network and particularly harmonics in the frequency range about 200–4000 Hz may cause disturbances on telecommunications networks because of crosstalk to adjacent telephone lines. FIG. 9a shows the fundamental embodiment of the main circuits for a two-pole HVDC station. The first pole comprises a conventionally designed convertor 191 in a 12-pulse connection which is connected in a manner known per se, over two transformers 192, to an a.c. network 90 (only indicated). The neutral terminal 1911 of the convertor is connected to a first electrode line 193 and its pole terminal 1912 is connected to one of the terminals of a first smoothing reactor 194, the other terminal of which is connected to a first pole line 195. A first passive filter 196 is connected with one of its terminals to the first pole line at a first connection point 1913, located as viewed from the convertor on the pole line beyond the first smoothing reactor, and is connected with its other terminal to one of the terminals of a first active filter 197 which comprises a controllable voltage generator 1971 and the other terminal of which is connected to a second connection point 1914 on the first electrode line such that the first passive and the first active filters together form a series circuit connected between the pole and electrode lines. The harmonic voltage US(1) between the pole and electrode lines is sensed with a first voltage measuring device 198 and the harmonic current IS(1) which flows through the pole line is sensed with a first current measuring device 199. The second pole comprises the same elements as the first one and in FIG. 9a these have been given designations corresponding to those stated above with the difference that the first FIG. 1 in these has been replaced by the FIG. 2. It is thus assumed in this case that the measuring device 7 described with reference to FIG. 1 comprises the first and second voltage measuring devices 198 and 298, respectively, and the first and second current measuring devices 199 and 299, respectively, and that these are adapted such that the direct currents flowing through the pole and electrode lines and the direct voltages between these lines have been eliminated from the measured values, which, from these voltage and current measuring devices, are supplied to a control member 6 designed according to the invention. The first and the second electrode line are connected together at a connection point 91 and then continue in the form of a common ground wire 92, in a manner known per se, to a ground electrode 93. A section B—B has been drawn in the figure so that it intersects the first and the second pole line and the ground wire. On a comparison with FIG. 1, the first power network thus corresponds to the two poles described above and the a.c. network 90. In FIG. 9a a first mesh current IC(1) and a second mesh current IC(2) have been marked, circulating in the circuit formed from the ground wire and the first and second pole lines, respectively. The voltages E(1) and E(2), respectively, driving the mesh currents have also been marked in the figure. The control member generates a first control signal C(1), which is supplied to the voltage generator 1971 in the first active filter 197 and a second control signal C(2), which is supplied to the voltage generator 2971 in the second active filter 297. The purpose of the device is to reduce the level of the disturbances which propagate from the first and the second pole out on the respective pole lines. The disturbance modes which are to be reduced are in the first place the so-called ground mode, in which a disturbance between on the one hand the two pole lines and on the other hand electrode lines, ground wires and ground propagates along these, and in the second place the so-called pole mode, in which a disturbance between the two pole lines propagates along these. In the frequency range in question (200–4000 Hz), viewed from the pole lines, the respective smoothing reactor connected in series with the convertor may approximately be replaced by an impedance with inductive characteristic in series with a disturbing voltage source. This impedance is designated Z1 for the first pole and Z3 for the second pole and these impedances are indicated by double arrows in FIG. 9a. The impedance of the first passive filter is designated Z2 and the impedance of the second passive filter is designated Z4. With designations introduced in connection with FIGS. 1–7, the following equivalences for the device shown in FIG. 9a are now obtained:

IC(1)=IS(1) and IC(2)=IS(2)

E(1)=US(1) and E(2)=US(2)

which means that

KI(1,1)=1 and KI(1,2)=0

KI(2,1)=0 and KI(2,2)=1

The ground mode and the pole mode which are to be controlled are advantageously described, in this case, with the aid of mesh currents, so the base modes BM(p) are assumed according to equation (3a). Equation (1a) can then be written as

IC(1)=ICN1(1)+A(1,1)*E(1)+A(1,2)*E(2)

IC(2)=ICN1(2)+A(2,1)*E(1)+A(2,2)*E(2)

Using the previously given definition of A(p,n), it is found directly from FIG. 9a that

A(1,1)=(Z1+Z2)/(Z1*Z2)

A(2,2)=(Z3+Z4)/(Z3*Z4)

The driving voltage E(2) influences the mesh current IC(1) by connection over the a.c. network 90 and it is assumed that this connection is negligible in the frequency range in question. The corresponding assumption then also applies to the influence of the driving voltage E(1) on the mesh current IC(2) and this results in

A(1,2)=A(2,1)=0

From equations (5a) and (6a) it is then found that the current and voltage filters 621 and 622 in the base mode filter should imitate the following filter functions:

BMFI(1,1)=BMFI(2,2)=1

BMFI(1,2)=BMFI(2,1)=0

BMFE(1,1)=-(Z1+Z2)/(Z1*Z2)

BMFE(1,2)=BMFE(2,1)=0

BMFE(2,2)=-(Z3+Z4)/(Z3*Z4)

Two base modes BM(1) and BM(2) are formed and can thus be written as

BM(1)=IC(1)-(Z1+Z2)/(Z1*Z2)*E(1)     (12)

BM(2)=IC(2)-(Z3+Z4)/(Z3*Z4)*E(2)     (13)

Figure 9B:
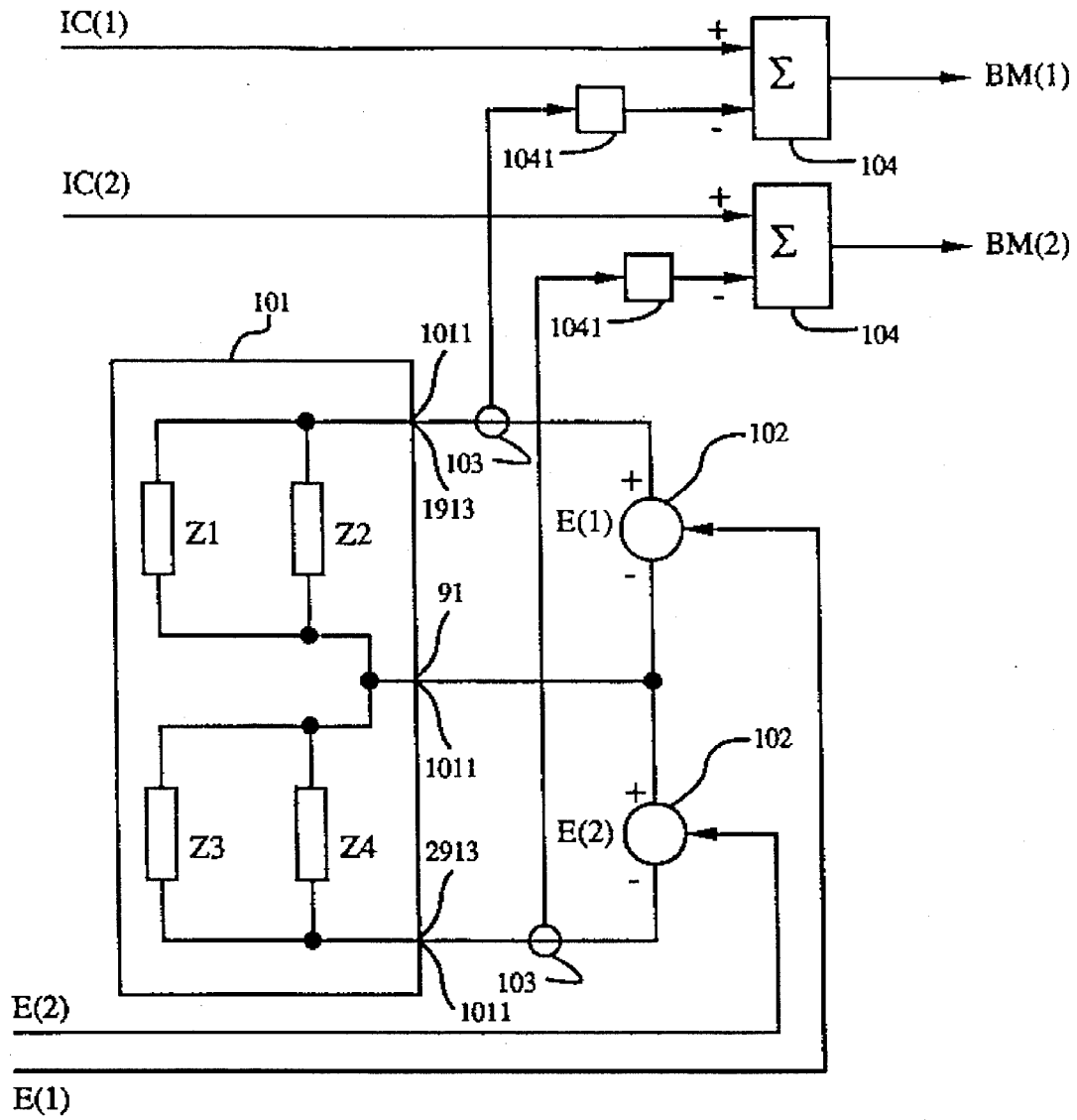

The filters BMFI and BMFE may, for example, be formed in a manner known per se as digital filters of the general formula $y(t)=\Sigma p_i*y(t-i)+\Sigma q_i*u(t-i)$, where $u(t)$ is the input signal of the filter and $y(t)$ its output signal and $p_i$ and $q_i$, respectively, are constants, which filters approximate the transfer functions derived above. Alternatively, a model described with reference to FIG. 8a may be used for generating the desired base modes. Such a model is shown in FIG. 9b where, for the sake of clarity, in the model of the first power network, the connection and interconnection points according to FIG. 9a have been marked. The calculation of the modes M(q) is made based on a consideration of the current for the purpose of forming modes which correspond to the concepts ground mode current and pole mode current, which concepts are often used in connection with systems for transmission of high-voltage direct current.

From FIG. 9a, with designations given therein, it is clear that the ground mode current IJ can be calculated as $$IJ=IC(1)-IC(2) \tag{14}$$

If now the assumption is made that the influence from the second power network is filtered out by means of the base mode filter, it is realized from equations (12) and (13) that $BM(1)-BM(2)=IC(1)-IC(2)$, and taking into account equation (14), mode M(1) is therefore chosen as $$M(1)=BM(1)-BM(2)=IJ \tag{15}$$

In the same way, the pole mode current IPOL can be calculated as the current which flows in through the pole line of the first pole and out through the pole line of the second pole via the electrode lines of the two poles. Provided that the recirculated ground current is evenly distributed between the two pole lines, the following is then obtained from FIG. 9a:

$$IC(1)=IPOL+0.5*IJ=IPOL+0.5*IC(1)-0.5*IC(2),$$

from which $$IPOL=0.5*IC(1)+0.5*IC(2)$$

and the mode M(2) is therefore selected, using the same reasoning as for the ground mode, as $$M(2)=0.5*BM(1)+0.5*BM(2) \tag{16}$$

With designations from equation (9) the following is then obtained:

$$MF(1,1)=1$$

$$MF(1,2)=-1$$

$$MF(2,1)=MF(2,2)=0.5$$

The modes M(1) and M(2) are now each supplied to a mode controller in the way described with reference to FIG. 6a. It is then desirable that the controller for one of the modes, by its influence on the active filter and its interference in the network, does not influence the second mode since this has an adverse effect on the elimination of disturbances. To achieve a minimization of this mutual influence, therefore, the control distributor is to be selected in an advantageous manner. In order not to burden the following calculations with factors which do not directly concern the invention, it is assumed in the following that the voltage CU which is generated by the controllable voltage generator, comprised in the respective active filter, instantaneously follows the control signals C(1) and C(2), respectively, supplied to the active filter and generated by the control member, and that it is directly proportional to the control signal.

First the above-mentioned influence on the base modes BM(1) and BM(2) from the active filters is calculated. The influence on the respective base mode from an interference from the active filter, that is, from a voltage generated by the voltage generator, can then be calculated from the diagram in FIG. 9a with the driving voltages E(n) short-circuited and without considering contributions from other current and/or voltage generators included in the power network in that these are regarded as respectively disconnected and short-circuited and replaced by their internal impedances. Under these conditions, the following is obtained from FIG. 9a:

$$BM(1)=IC(1)=-(1/Z2)*CU(1)$$

and $$BM(2)=IC(2)=-(1/Z4)*CU(2)$$

where CU(1) and CU(2) designate the voltage generated by the respective controllable voltage generator 1971 and 2971 and thus any other influence on the respective base mode has not been taken into consideration in these expressions.

From this the following is directly obtained:

$$M(1)=-(1/Z2)*CU(1)+(1/Z4)*CU(2)$$

$$M(2)=-0.5*(1/Z2), CU(1)-0.5*(1/Z4)*CU(2)$$

in which expressions, thus, only the influence from the active filters is considered.

In matrix form these equations can also be written as $$\begin{bmatrix} M(1) \\ M(2) \end{bmatrix} = \begin{bmatrix} -(1/Z2) & (1/Z4) \\ -0.5*(1/Z2) & -0.5*(1/Z4) \end{bmatrix} * \begin{bmatrix} CU(1) \\ CU(2) \end{bmatrix} \tag{17}$$

The control signals C(r) can be expressed as follows, with designations previously introduced in connection with the description of the control distributor 65, the multiplexor 66 and the summator unit 67 according to FIG. 6a, $$C(1)=SF(1,1)*DM(1)+SF(2,1)*DM(2)$$

$$C(2)=SF(1,2)*DM(1)+SF(2,2)*DM(2)$$

or in matrix form $$\begin{bmatrix} C(1) \\ C(2) \end{bmatrix} = \begin{bmatrix} SF(1,1) & SF(2,1) \\ SF(1,2) & SF(2,2) \end{bmatrix} * \begin{bmatrix} DM(1) \\ DM(2) \end{bmatrix} \sim \begin{bmatrix} CU(1) \\ CU(2) \end{bmatrix} \tag{18}$$

where the sign ~ denotes proportionality.

The transfer functions for the filters SF(q,r) shall now be chosen such that the mode M(1) becomes independent of the controller signal DM(2) and the mode M(2) becomes independent of the controller signal DM(1).

It is realized that this independence generally can be achieved if the matrix $$[SF]^T = \begin{bmatrix} SF(1,1) & SF(2,1) \\ SF(1,2) & SF(2,2) \end{bmatrix}$$

is proportional to the inverse to the matrix $$[Z] = \begin{bmatrix} -(1/Z2) & (1/Z4) \\ -0.5*(1/Z2) & -0.5*(1/Z4) \end{bmatrix}$$

which expresses the dependence of the modes M(q) on the control signals C(r) according to equation (17).

According to equations (17) and (18) it is necessary that $$[M]=[Z]*[CU]-[Z]*[SF]^T, [DM]$$

and if now $[SF]^T \sim [Z]^{-1}$ is assumed, the following is obtained $$[M] \sim [DM]$$

which expresses the desired independence.

In this case, the inverse $[Z]^{-1}$ will be as follows $$\begin{bmatrix} -0.5 * (1/Z4) - (1/Z4) \\ 0.5 * (1/Z2) - (1/Z2) \end{bmatrix}$$

multiplied by a common factor $$\{1/(1/Z2)*0.5*(1/Z4)+(1/Z4)*0.5*(1/Z2)\}=Z2*Z4$$

From this, the transfer functions of the filters SF(q,r) can be identified, in which case they can suitably be divided into a second part SF2(q,r) which is identified from the inverse matrix above and into a first part SF1(q) which is identified from the common factor above and which is common to all the filters which represent the transfer functions SF2(q,r).

Figure 9C:
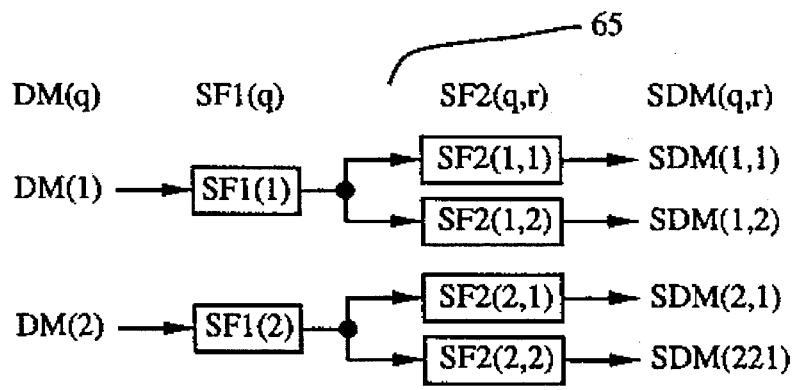

The control distributor may in this case be given a configuration according to FIG. 9c.

If the impedances Z2 and Z4 for the first and second passive filters are chosen equal, the transfer functions of the filters SF(q,r) can be chosen as constants according to the following:

$$SF(1,1)=0.5$$

$$SF(1,2)=-0.5$$

$$SF(2,1)=SF(2,2)=1$$

Figure 13:
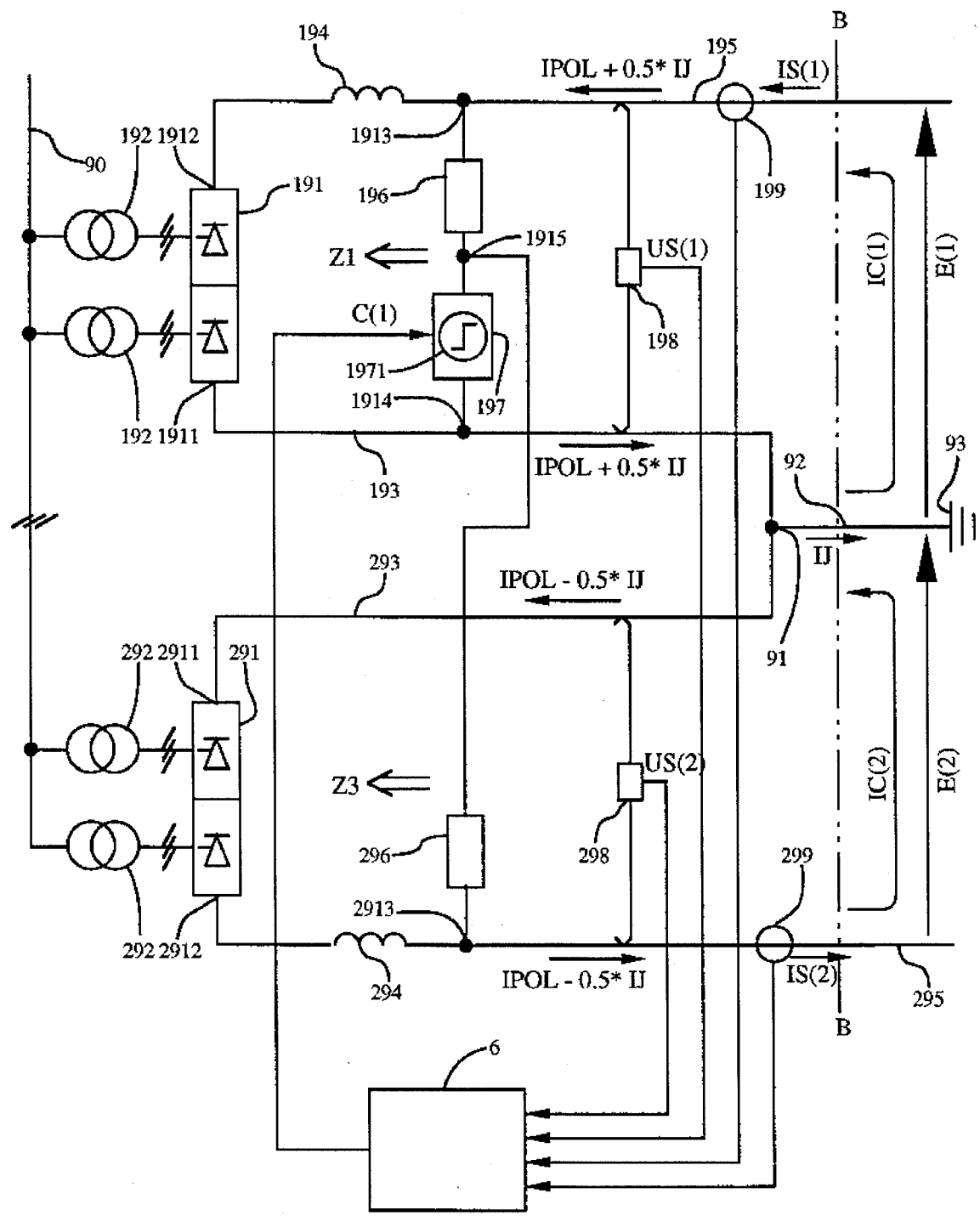

Another application of the invention within plants for high-voltage direct current will be described in the following with reference to FIG. 13. In this application, the task is to influence only the ground mode current emanating from a two-pole HVDC station. The plant shown in FIG. 13 differs substantially from the plant shown in FIG. 9a in that the second active filter is removed and the second passive filter now is connected between the connection point 2913 on the second pole line and a connection point 1915 located on the connection between the first active and the first passive filter. In other respects, the same designations and references are used throughout FIG. 13 as are used with reference to FIG. 9a. The calculations of this case takes place in a manner analogous to that used in the above calculations up to the calculation of the influence on the base modes BM(1) and BM(2) from the active filters. This influence is calculated based on the same reasoning as in the preceding example but now yields the following results:

$$BM(1)=-(1/Z2)*CU(1)$$

$$BM(2)=(1/Z4)*CU(1)$$

This yields for the modes M(1) corresponding to the ground mode current and M(2) corresponding to the pole mode current $$M(1)=-(1/Z2)*CU(1)-(1/Z4)*CU(1)$$

$$M(2)=-0.5*((1/Z2)*CU(1)-(1/Z4)*CU(1))$$

It is readily realized from the expression for M(2) that if the impedances Z1 and Z2 for the first and second passive filters are chosen equal, the mode M(2) will be zero, which means that the control member does not influence the pole mode current. If this choice is made, the following equations thus apply $$M(1)=-(2/Z2)*CU(1)$$

$$M(2)=0$$

In this case, the control distributor will be trivial since only one mode is present.

It is, of course, also possible to apply the invention, for example, to elimination of the harmonic voltages, generated by the convertors, on the d.c. lines also in single-pole HVDC stations. Such an application will be studied in the following whereby, with certain simplified assumptions, simple models of the first and second power network are introduced in order to demonstrate the technical effect of the invention by means of numbers. However, the computed example is of a general character and need not necessarily constitute a model of a single-pole HVDC station.

Figure 10A:
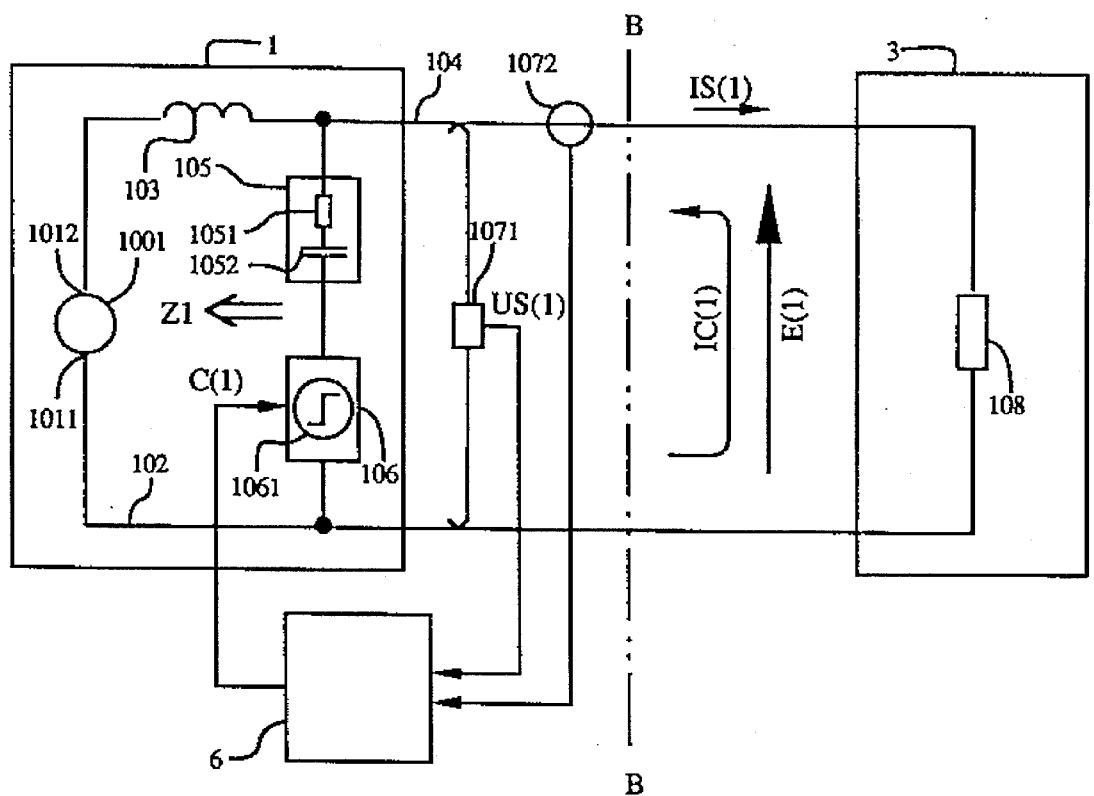
FIGS. 10b–10g show a number of voltage and current waveforms as well as admittance functions relating to the configuration according to FIG. 10a, FIG. 10h shows a first and a second power network interconnected by two conductors as well as a control member according to the invention, with a different configuration of the second power network compared with FIG. 10a, FIGS. 10i–10n and 10p–10r show a number of voltage and current waveforms as well as admittance functions relating to the configuration according to FIG. 10h, FIGS. 11a–11d show a number of alternative methods for forming base modes according to the invention.

In FIG. 10a, the first power network 1 comprises a first disturbance source 1001 in the form of a voltage generator which in this example is conceived to generate voltage harmonics analogous to those generated by a convertor on a line for transmission of high-voltage direct current. The disturbance source is connected with one of its terminals 1011 to an electrode line 102 and with its other terminal 1012 to a smoothing reactor 103, the second terminal of which is connected to a pole line 104. A passive filter 105 is connected with one of its terminals to the pole line at a connection point, located, as viewed from the first power network, on the pole line beyond the smoothing reactor, and is connected with its other terminal to one of the terminals of an active filter 106, which comprises a controllable voltage generator 1061 and the other terminal of which is connected to the electrode line 102 such that the passive and the active filters form a series circuit between the pole and electrode lines. The voltage US(1) between the pole and electrode lines is measured with a voltage measuring device 1071 and the harmonic current IS(1) which flows through the pole line is sensed with a current measuring device 1072. The pole and electrode lines connect the first power network to a second power network 3, which in FIG. 10a is represented by a second resistor 108 connected between the pole and electrode lines. In the figure, a section B—B is drawn such that it intersects the pole and electrode lines, and a mesh current IC(1) and a voltage E(1) driving the mesh current are also marked. A control member 6, which is supplied with the sensed voltage US(1) and the sensed current IS(1), generates a control signal C(1) which is supplied to the voltage generator 1061 in the active filter 106. The purpose of the device is to reduce the level of the disturbances, generated by the disturbance source 1001, which occur at section B—B. It should be noted that in this example the current IS(1) has been given a reference direction opposite to that marked in FIG. 9a. By analogy with the calculations of the example stated above with a two-pole HVDC station, it is found that $$IC(1)=-IS(1)$$

$$E(1)=US(1) \text{ and}$$

$$KI(m,k)=1.$$

The assumption IC(1)=ICN1(1)+A(1,1)*E(1), with designations as above, gives $$A(1,1)=(Z1+Z2)/(Z1*Z2)$$

$$BMFI(1,1)=1$$

$$BMFE(1,1)=-(Z1+Z2)/(Z1*Z2)$$

from which analogously follows the base mode $$BM(1)=IC(1)-(Z1+Z21/(Z1,Z2)*E(1)$$

and with MF(1,1)=1, the mode $$M(1)=BM(1)=IC(1)-(Z1+Z2)/(Z1*Z2)*E(1)$$

Figure 10H:
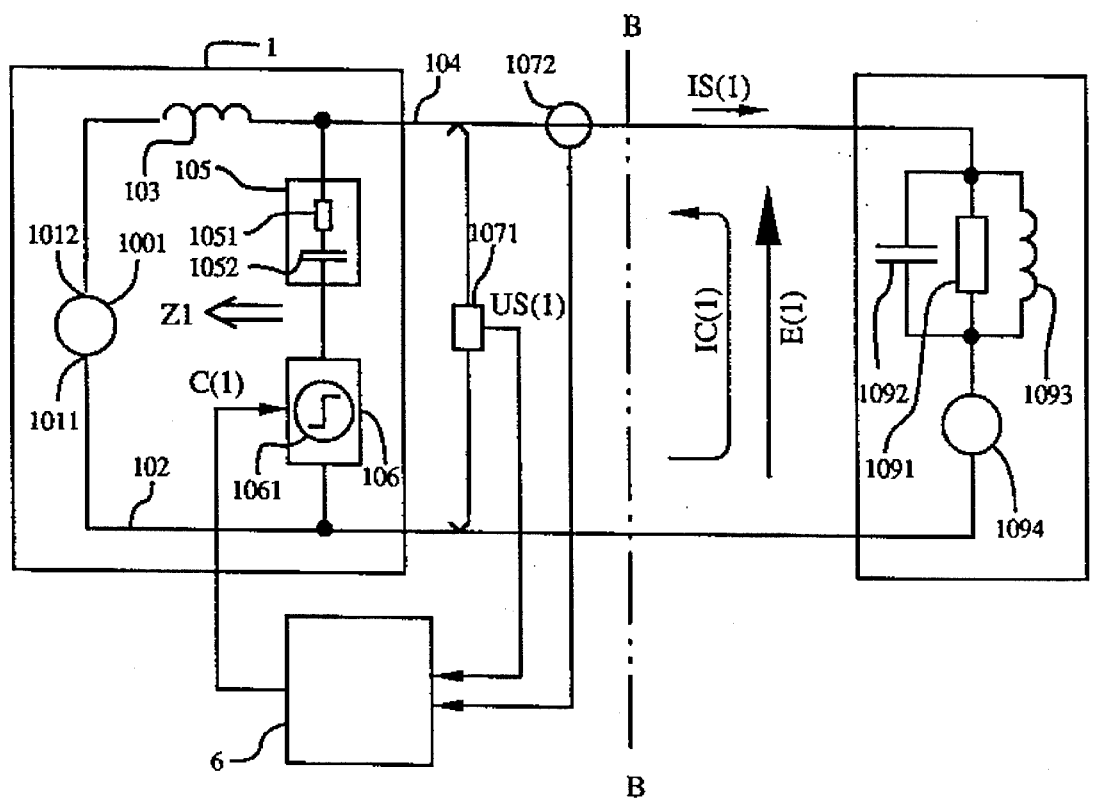
Figure 10B:
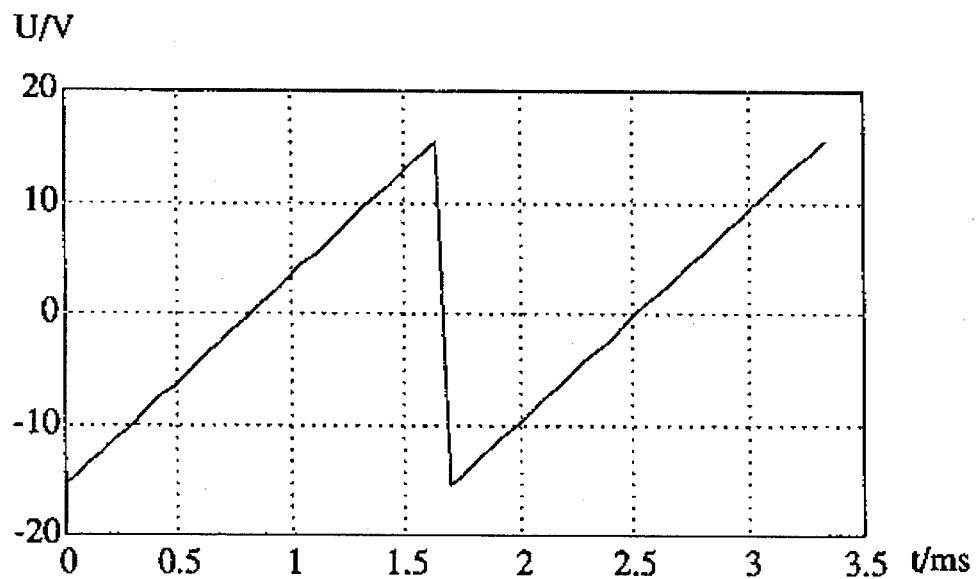

The disturbance voltage generated by the first disturbance source 1001 is assumed to have a saw-tooth shape with the variation shown in FIG. 10b, where on the horizontal axis the time t in milliseconds has been plotted against the voltage in volts, generated by the disturbance source, on the vertical axis.

It is further assumed that the passive filter consists of a first resistor 1051 and a first capacitor 1052 connected to each other in a series connection and that the first resistor has the resistance 10 ohms and the first capacitor has the capacitance 0.9 microfarad. Let it further be assumed that the smoothing reactor 103 has the inductance 200 millihenry. A calculation of the admittance A(1,1) with these values inserted gives its amplitude dependence and frequency dependence as shown in FIGS. 10c and 10d, respectively, where on the horizontal axis the frequency in Hz is plotted against the amplitude gain of the admittance, on the vertical axis, expressed as a factor and its phase shift in electrical degrees, respectively.

It is further assumed that the resistor 108 in the second power network according to FIG. 10a has a resistance of 300 ohms.

Figure 10C:
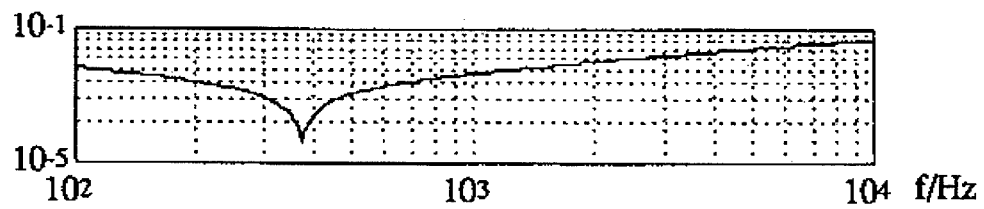
Figure 10D:
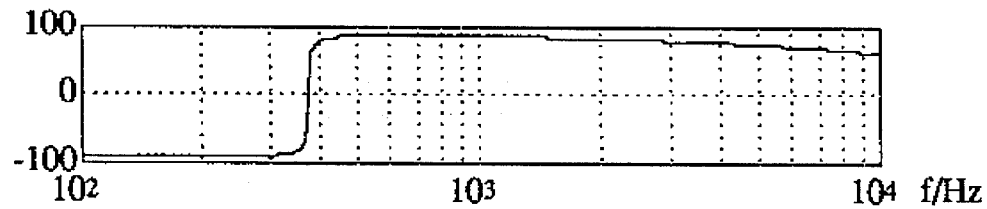
Figure 10E:
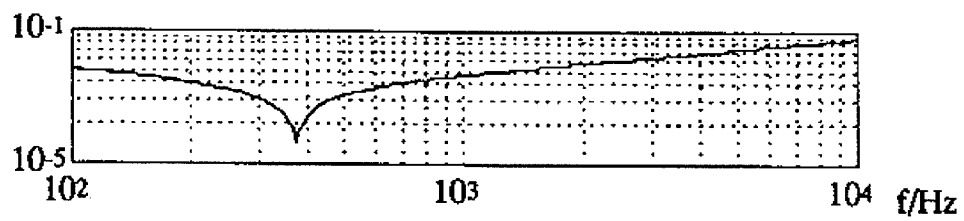
Figure 10F:
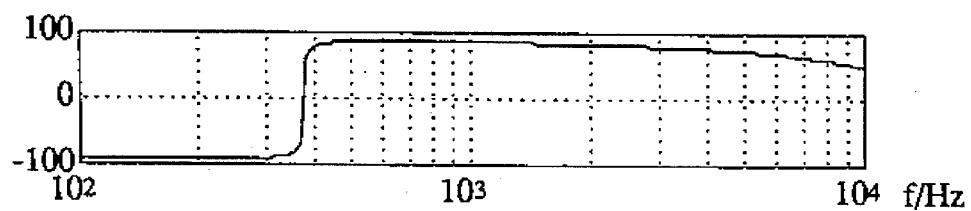
Figure 10G:
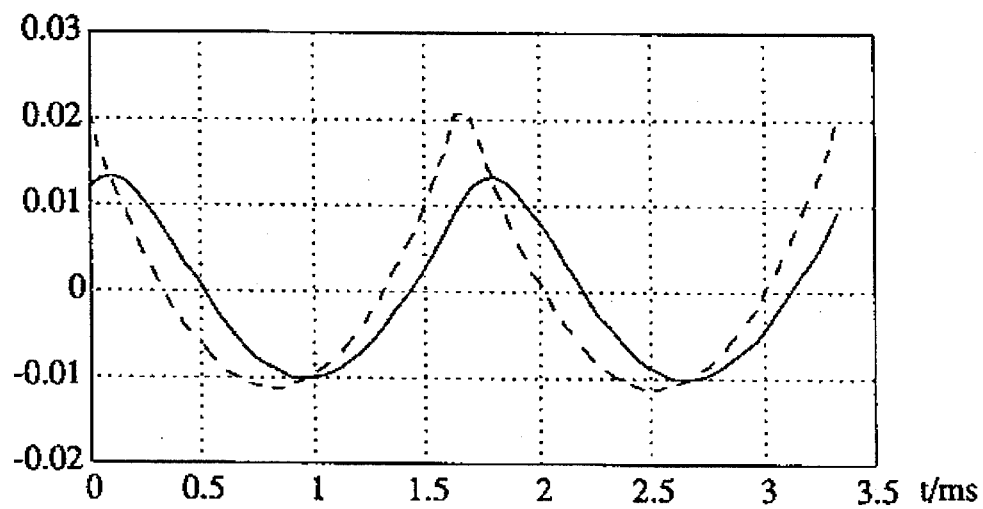

Simulations have been carried out, wherein the admittance A(1,1) has been simulated in a digitally sampled filter, whose amplitude dependence and frequency dependence are shown in FIGS. 10e and 10f, respectively, which figures have the same axes as FIGS. 10c and 10d, respectively. FIG. 10g shows the result of a simulation of the measured harmonic current IS(1)=−IC(1) and by way of comparison the mode M(1) according to the equation above, in which case it is assumed that the control member 6 has not interfered via the control signal C(1), that is, C(1) constant. On the horizontal axis the time t in milliseconds is plotted against the measured current IS(1) in continuous line and the mode M(1) in dashed line, on the vertical axis, both expressed in amperes.

Figure 10I:
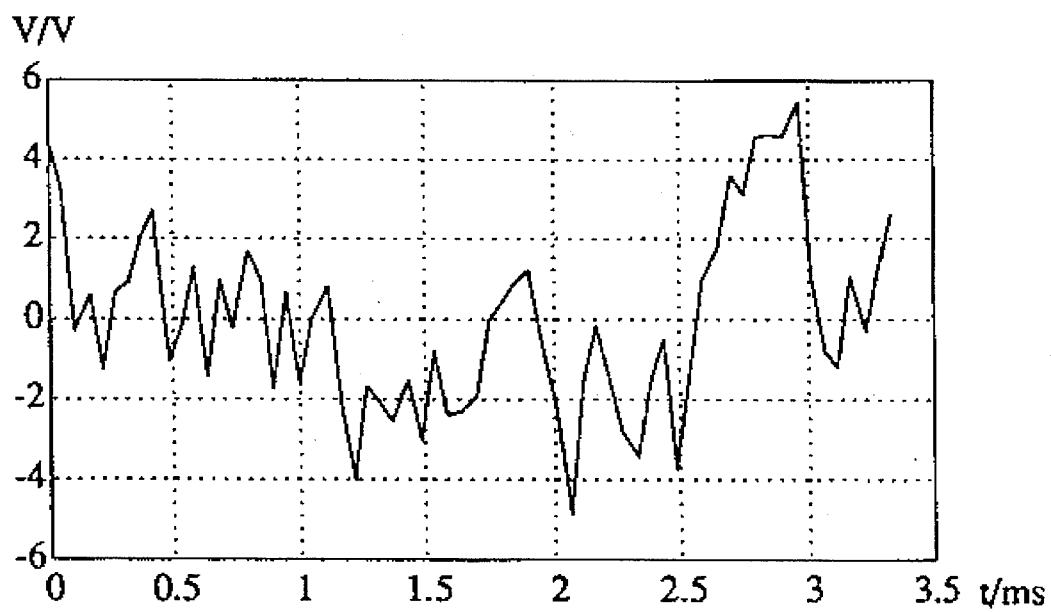

The simulation results obtained in this way will now be compared with the case where the second power network instead comprises a parallel resonance circuit of a third resistor 1091, a second capacitor 1092 and a reactor 1093, all being parallel-connected to each other and series-connected to a second disturbance source 1094, the circuit thus obtained being connected between the pole and electrode lines as shown in FIG. 10h. It is assumed that the third resistor 1091 has a resistance of 300 ohms, the second capacitor a capacitance of 0.5 microfarad and the reactor 1093 an inductance of 10 millihenry. The disturbance voltage generated by the second disturbance source is assumed to have a variation as shown in FIG. 10i, where on the horizontal axis the time t in milliseconds is plotted against the voltage V in volts, on the vertical axis, generated by the disturbance source.

Figure 10J:
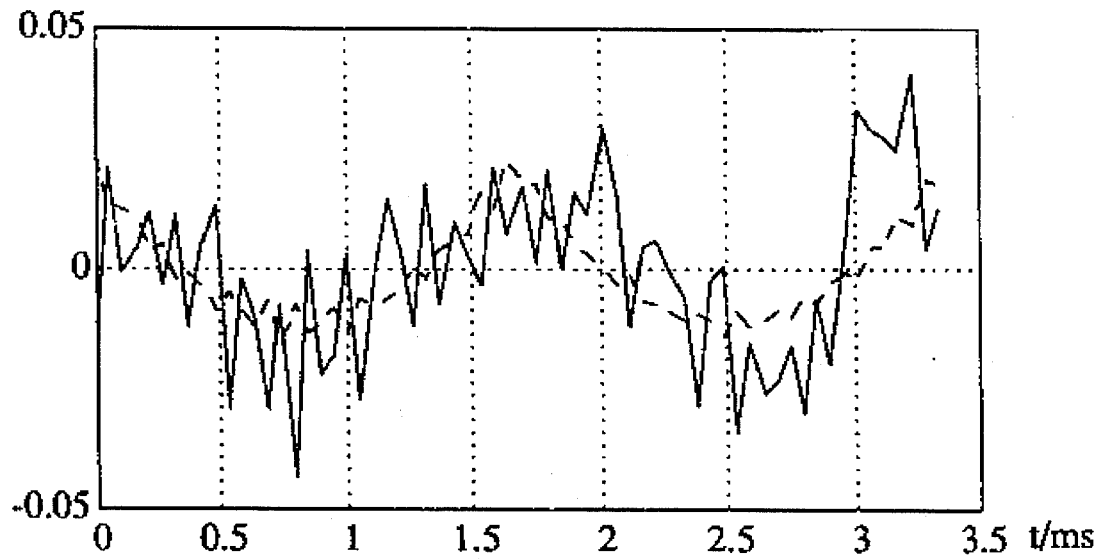

FIG. 10j shows the result of a simulation of the measured harmonic current IS(i)=−IC(1) and by way of comparison the mode M(1) according to the equation above with the second power network according to FIG. 10h, in which case it is assumed that the control member 6 has not interfered via the control signal C(1), that is, C(1) constant. On the horizontal axis the time t in milliseconds is plotted against the measured current IS(1) in continuous line and the mode M(1) in dashed line, on the vertical axis, both expressed in amperes. A comparison with FIG. 10g shows that the measured current IS(1) now has a greatly deviating appearance, caused by the disturbance source and the changed impedance conditions in the second power network. The mode M(1), on the other hand, has a substantially unchanged appearance, which shows the effect of the invention to bring about an independence of the second power network in the mode.

Figure 10K:
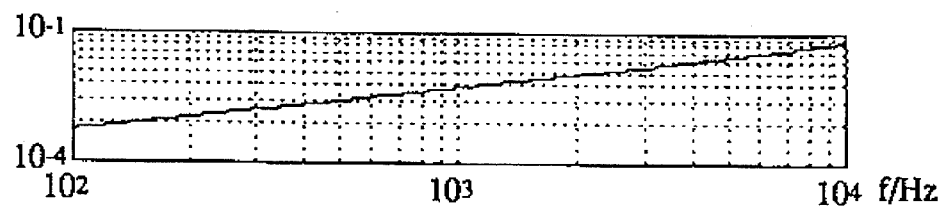
Figure 10L:
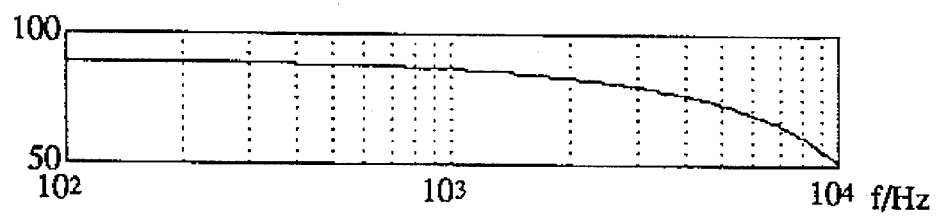
Figure 10M:
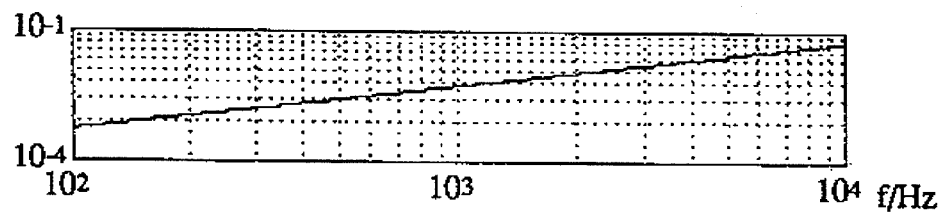
Figure 10N:
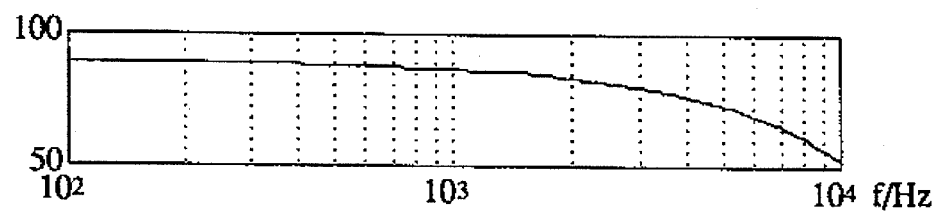

The above-mentioned desired independence can also be illustrated by considering the transfer function FCM from the control signal C(1) to the mode M(1) for the two cases where the second power network is designed according to FIG. 10a and FIG. 10h, respectively. FIGS. 10k and 10l show the amplitude dependence and frequency dependence of this transfer function for the case where the second power network 3 is designed according to FIG. 10a, where on the horizontal axis the frequency in Hz is plotted against the amplitude gain of the transfer function, on the vertical axis, expressed as a factor and its phase shift, respectively, in electrical degrees whereas FIGS. 10m and 10n show the corresponding variations for the case where the second power network 3 is designed according to FIG. 10h. On a comparison it is clear that the frequency dependence of the transfer function FCM is practically identical in both cases, which thus means that a controller for controlling the first power network can be designed independently of the second power network.

Figure 10P:
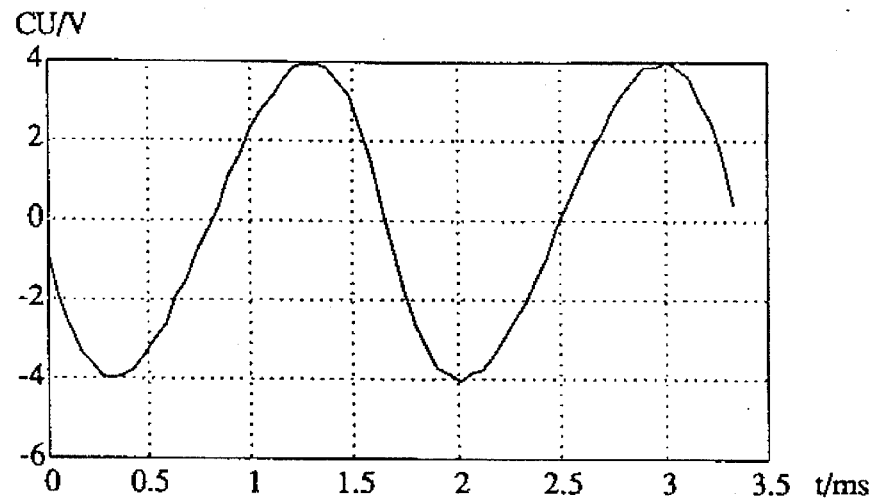
Figure 10Q:
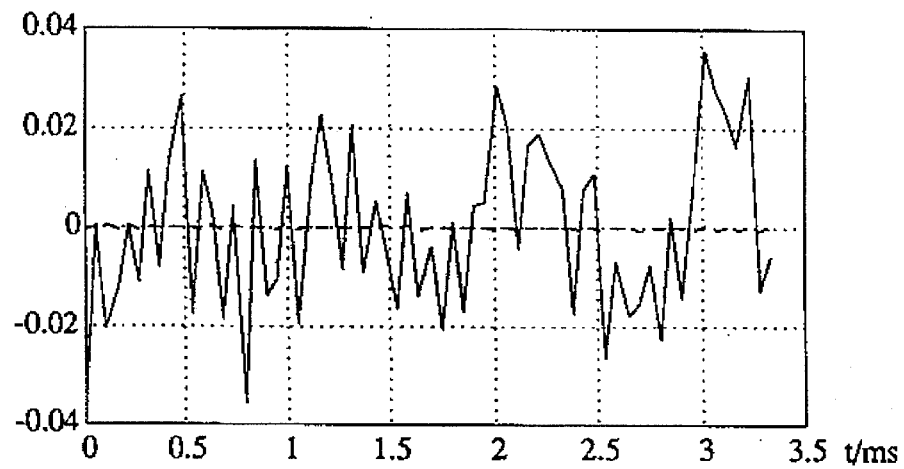
Figure 10R:
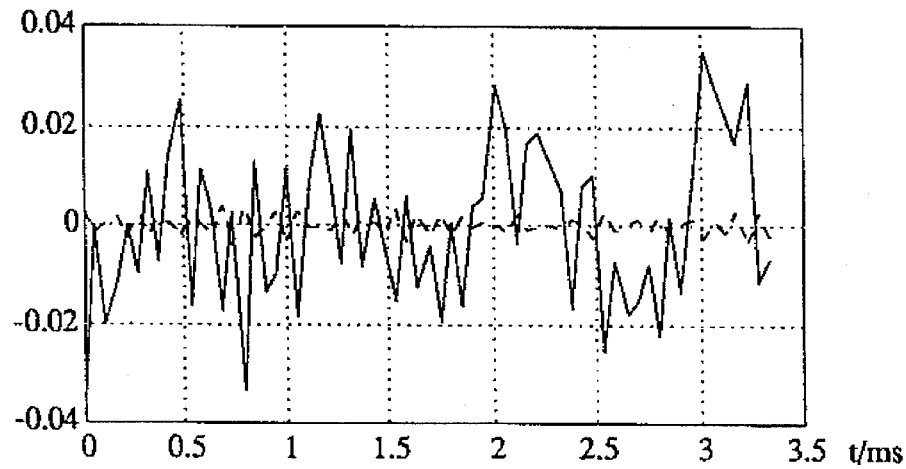
Figure 11A:
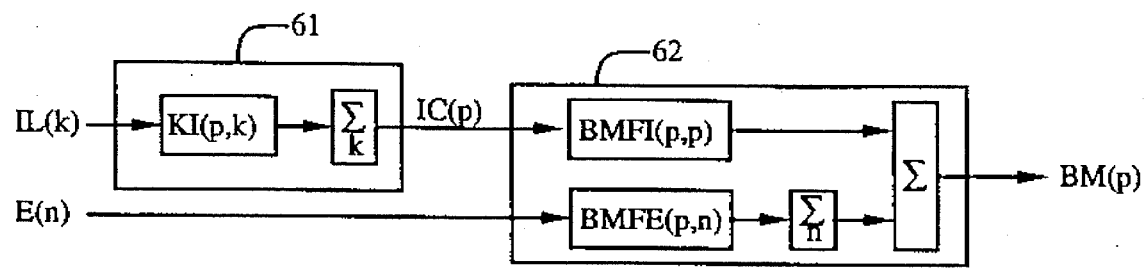
Figure 11B:
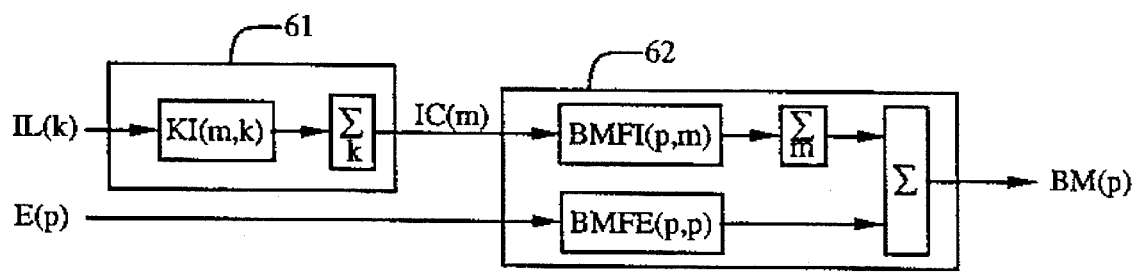
Figure 11C:
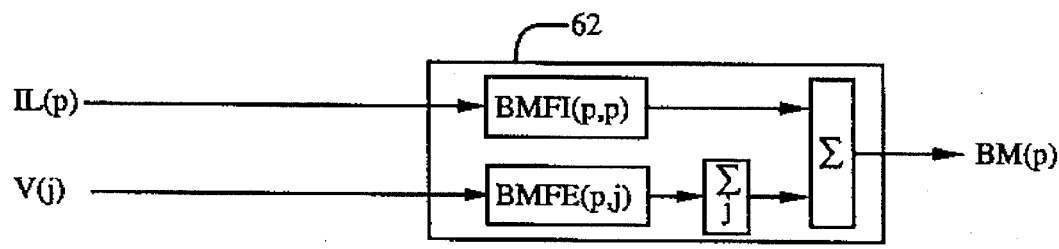
Figure 11D:
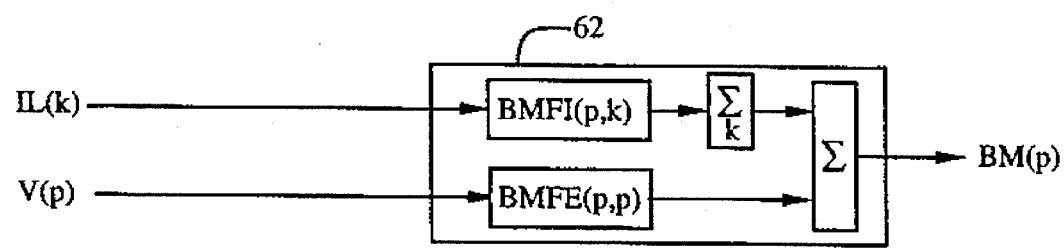

The mode M(1) is now supplied to a mode controller comprised in the control member 6 in the way described with reference to FIG. 6a. It is assumed in the following, for the sake of simplicity, that the controllable voltage generator comprised in the active filter generates a voltage which instantaneously follows the control signal C(1) supplied to the active filter and generated by the control member. The control distribution will in this case, with only one controllable network element, be trivial and the filter function SF(1,1) is set equal to one. Further, the reference value RM(1) supplied to the controller is set at zero, which means that the controller strives to control the mode M(1) to zero by means of the active filter. Let it further be assumed, in order to simplify the calculations, that the controller is ideal, which in this case means that its transfer function, with maintained stability in the control system, can be formed as the inverse to the transfer function 1/Z2 between the control signal C(1) and the mode M(1). With switched-in control and with the second power network designed according to FIG. 10h, a control signal C(1) according to FIG. 10p is then obtained, where on the horizontal axis the time t in milliseconds is plotted against the voltage CU, on the vertical axis, which the active filter supplies to the first power network, whereby it is assumed in this case that the control signal C(1) and the voltage mentioned are directly proportional to each other. The eliminated mode M(1) and the measured current IS(1) are shown in FIG. 10q, where on the horizontal axis the time t in milliseconds is plotted against the measured current IS(1) in continuous line and the mode M(1) in dashed line, on the vertical axis, both expressed in amperes. As will be clear from this figure, the mode lies practically constant at the value zero. The case with eliminated mode in FIG. 10q can be compared with the result obtained when the controller in the control member 6 is inactive, that is, the control signal C(1) is constant and all the voltage sources in the first power network according to FIG. 10h are short-circuited, including that of the first disturbance source 1001 with the saw-tooth-like variation as shown in FIG. 10b. From FIG. 10r it is clear that the mode M(1) in this case only shows insignificant deviations from the value zero and a comparison with FIG. 10q thereby shows that the controller is able to eliminate the effect from the disturbance source mentioned.

Figure 12:
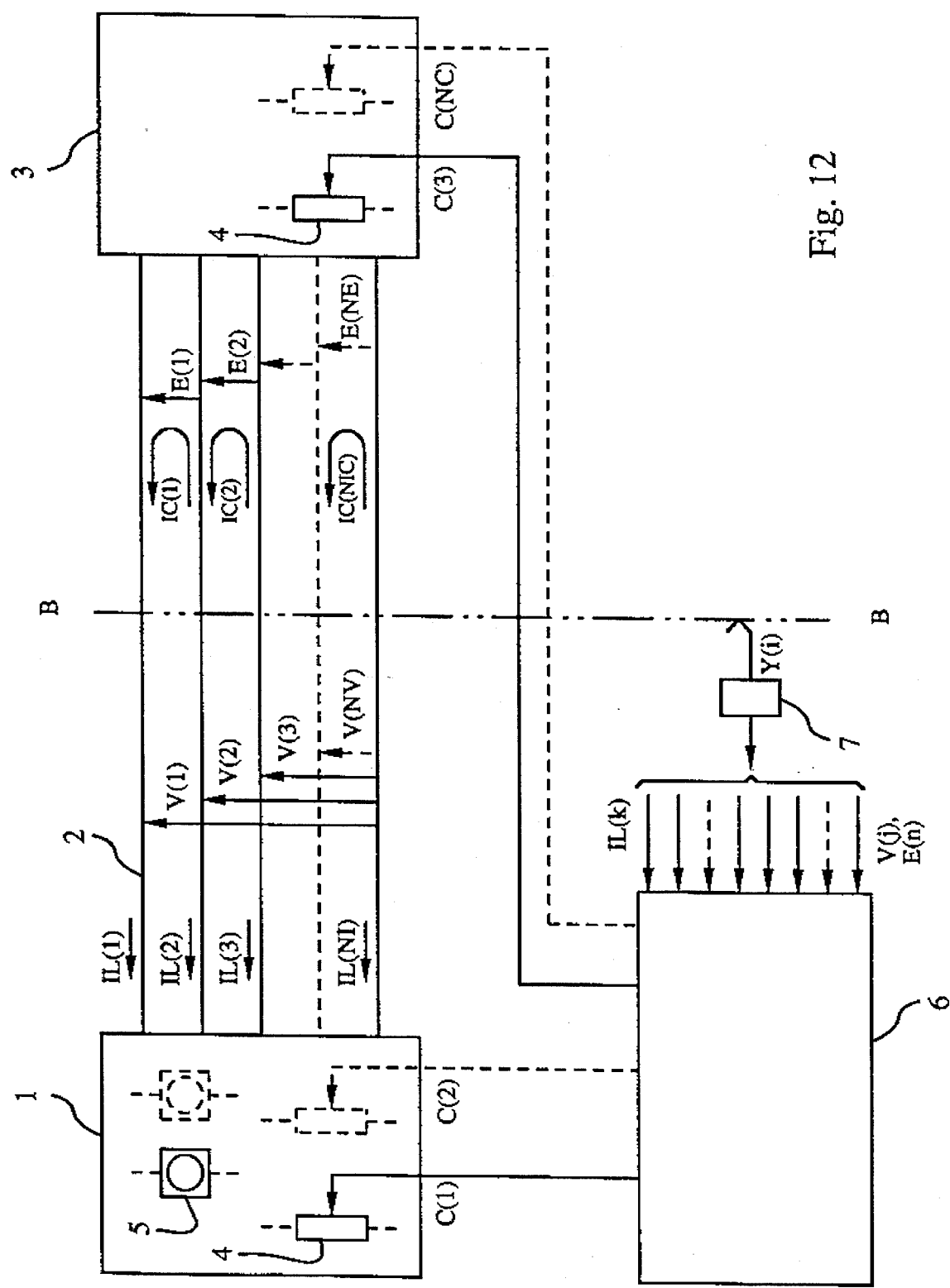
FIG. 12 shows a first and a second power network interconnected by a number of conductors as well as a control member according to the invention, which is adapted to influence one of the power networks, FIG. 13 schematically shows a two-pole HVDC station with an active filter at one pole and a control member according to the invention, and FIG. 14 schematically shows a two-pole HVDC station with an active filter in the second power network for feed-forward control, and a control member according to the invention.

The embodiments described above entail, in principle, a feedback control of the modes formed according to the invention. However, the invention is also applicable to the case where a feed-forward control of the influence of the first power network is to be achieved. Such a case is illustrated in FIG. 12, in which, compared with FIG. 1, the second power network 3 comprises at least one controllable network element 4. In this embodiment, base modes and modes are formed in the same way as described before but at least one control signal generated by the control member is supplied to at least one network element located in the second power network. Control signals supplied to the second power network are determined based on the criterion that the influence of current and/or voltage generators located in the first power network on the second power network and the influence from control signals generated by the control member are jointly to achieve the desired influence on the second power network. This determination, with knowledge of the power networks, can be made by means of calculations, in which case the control signal (or signals) can be solved as a function (or functions) of base modes and of the desired influence and/or by means of models of the power networks. The second power network can comprise control circuits for control of the output signals, impedance, etc., of the network elements with the control signal as reference value.

A mode controller, according to the embodiment of the control member described with reference to FIG. 6a, degenerates, in the case of feed-forward control, into a proportional controller with a sign reversal of the difference between the reference value $RM(q)$ and the mode $M(q)$ and possibly a frequency dependent amplitude influence on the controller signal. The mode controller, which now via the control distributor influences network elements in the second power network, will thereby not be influenced, via the value of the mode supplied to the mode controller, by control interference originating from its own controller signal since the base mode filters by their function filter out the results of such interference. This means an open-loop, i.e. feed-forward, control and provides good possibilities of a stable control. The transfer functions $SF(q,r)$ included in the control distributor are thereby determined while taking into account the properties of the power networks but the adaptation thus obtained can, of course, be achieved in other parts of the control member or outside this. It is, of course, possible that both the first and the second power networks comprise one or more controllable network elements and that the control member generates control signals to network elements in both the power networks. In this way, a combination of feedback control and feed-forward control is achieved. In the event that only one of the power networks comprises controllable network elements, these control signals generated by the control member, which are supplied to the network elements, bring about either only a feedback control or only a feed-forward control.

Figure 14:
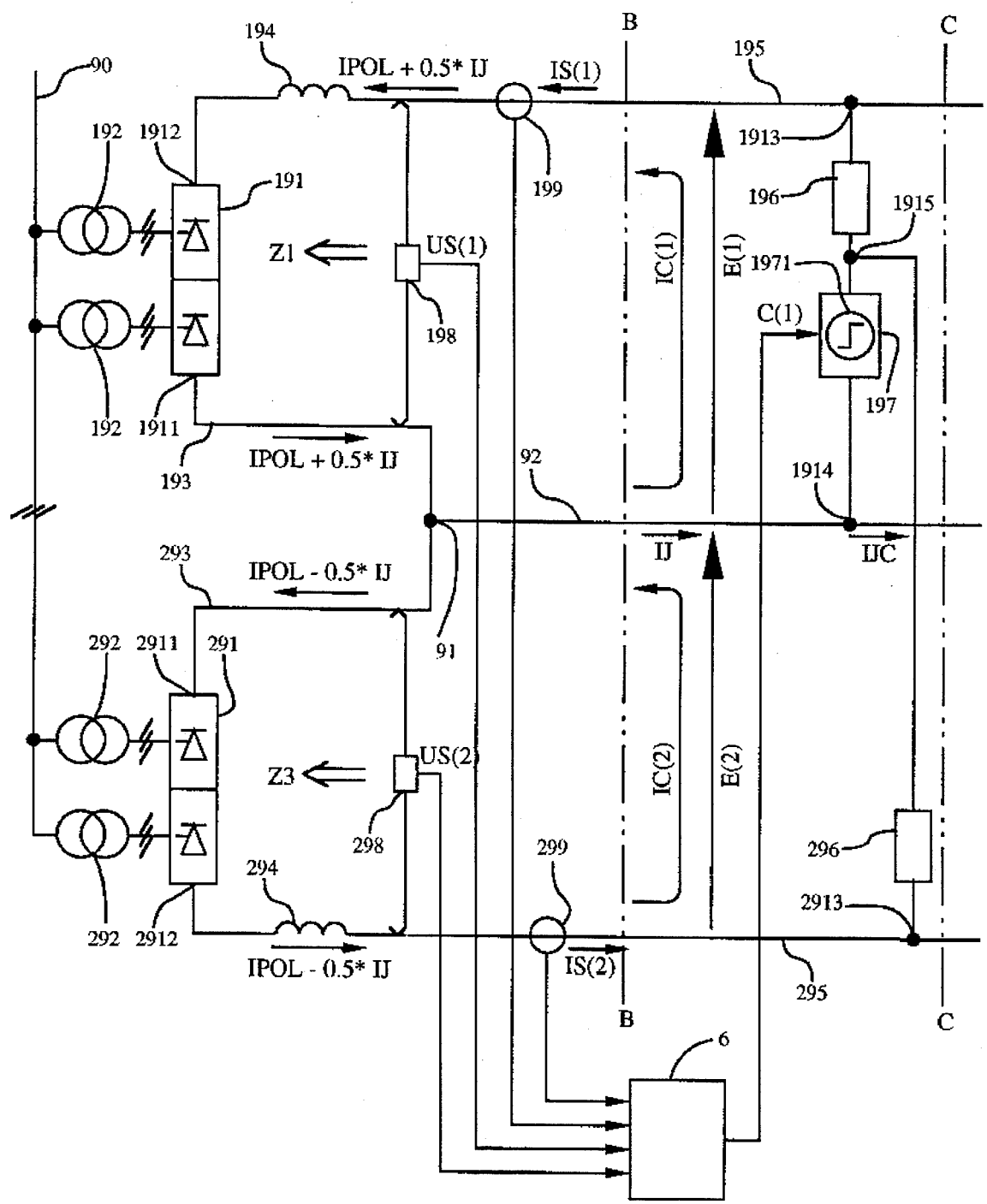

As an embodiment of a feed-forward control, an application of the invention within plants for high-voltage direct current will now be described with reference to FIG. 14. Also in this case, the task is to influence only the ground mode current flowing from a two-pole HVDC station. The plant shown in FIG. 14 differs from that shown in FIG. 13 substantially in that the first active filter and the first and second passive filters are now located on the other side of the section B—B, as viewed from the HVDC station, that is, beyond the section and thus comprised in the second power network. For the sake of simplicity, however, references and designations used in connection with the description of FIG. 13 have been retained. Further, a second section C—C in the second power network is conceived to intersect the first and second pole lines as well as the ground wire in such a way that the first active filter and the first and second passive filters, as viewed from the HVDC station, are located beyond the second section C—C. The task is to influence the ground mode current IJC which flows through the second section C—C.

The calculations of this embodiment take place in a manner analogous to those carried out above, however, with the difference that compared with the case calculated with reference to FIG. 9a, when calculating the admittance functions $A(1,1)$ and $A(2,2)$, the parallel-connected impedances Z1, Z2 and Z3, Z4, respectively, are replaced by the impedances Z1 and Z3, respectively.

This gives $$BMFI(1,1)=BMFI(2,2)=1$$

$$BMFI(1,2)=BMFI(2,1)=0$$

$$BMFE(1,1)=-(1/Z1)$$

$$BMFE(1,2)=BMFE(2,1)=0$$

$$BMFE(2,2)=-(1/Z3)$$

Hence, for the base modes the following expressions are obtained $$BM(1)=IC(1)-(1/Z1)*E(1)$$

$$BM(2)=IC(2)-(1/Z3)*E(2)$$

and for the mode $M(1)$, by analogy with the previous equation (15), $$M(1)=BM(1)-BM(2)$$

$$MF(1,1)=1$$

$$MF(1,2)=-1$$

The criterion of how the control signal $C(1)$ is to be formed will now be calculated from expressions for the ground current IJC in section C—C while assuming a short circuit, located beyond the second section C—C, as viewed from the HVDC station, between the first and second pole lines and the ground wire. The current thus calculated constitutes the contribution from current and/or voltage sources located on this side of the second section C—C, as viewed from the HVDC station, and this current, as the task has been defined, is to be controlled to a desired value $RM(q)$, that is, in this case $RM(1)$. The base modes, in an equivalent diagram or in a model of the first power network, can be interpreted as internal current sources connected in parallel with the impedances Z1 and Z3, respectively, and this interpretation of the base modes as current sources gives for the control signal $$C(1)=\{[(BM(1)-BM(2)]-RM(1)]-\{(Z2-Z4)/(Z2+Z4)\}$$

For a direct comparison with FIG. 6a, this equation can be written as $$\{RM(1)-[BM(1)-BM(2)]*(-1)*((Z2*Z4)/(Z2+Z4))=C(1)$$

where thus $BM(1)-BM(2)=M(1)$

Thus, in this case the controller 64 is given a gain equal to minus one and the control filter SF(1,1) in the control distributor is given the transfer function {(Z2*Z4)/(Z2+Z4)}. The value of the reference value RM(1) may, for example, be set at zero.

In those cases where the principle of superposition is not valid in full for the first power network because this network comprises non-linear elements or because of switchings in the network and compensation for these non-linearities is not made in the base mode filters, base modes and modes will contain certain information about the interaction of the second power network with the first power network. In such cases, this is reflected in base modes and modes as imaginary current or voltage sources in the first power network. From the point of view of control, these imaginary disturbance sources can be compared with real disturbance sources and their effect can therefore be influenced with a control member designed according to the invention. In, for example, power networks comprising thyristors or thyristor valves, non-linearities will arise in those instants when switchings between different thyristors or thyristor valves take place. During the interval between the switchings, however, the circuits are linear at least from this point of view, and in fact the switchings give rise to the voltage/disturbance sources which are eliminated with a control member according to the invention.

The invention is not limited to the embodiments shown, but several modifications are feasible within the scope of the inventive concept. Thus, for example, the base modes BM(p) may be formed in such a way that one of these base modes is formed, for example, from equation (8a) whereas another base mode is formed, for example, based on equation (8c), whereby in this example it is, of course, assumed that the measuring device 7 is adapted to form both the driving voltages E(n) and the node voltages V(j).

To reduce the sensitivity of the device to, for example, calibration errors in transducers, it may be advantageous, when calculating the transfer functions BMFI(p,m) and BMFE(p,n), respectively, of the current and voltage filters, to select the gain factors of these transfer functions somewhat lower than the theoretically correct values of the transfer functions A(p,n), B(p,m), F(p,j) and G(p,k) introduced into equations (1a) . . . (1d). In the case where the base modes are formed with the aid of network models, as described with reference to FIGS. 8a–8c, this is represented by the fact that the constant in the multiplier units 1041 is selected somewhat smaller than one.

The control member may be wholly or partially in the form of hardware, but in many cases it may be advantageous to perform at least some of these functions by means of calculations and/or simulations in digital or analog models in a computer suited for the purpose.

The control member or parts thereof, such as base mode filter, network model or mode generator, may be designed adaptable to a first power network, the parameters of which vary in time. Such an adaptation is thereby controlled by time signals and/or by known values of, for example, currents, voltages or other signals in one of the power networks. By means of calculations, models or from tables stored in memory members, parameter values are formed in dependence on the above-mentioned time signals and/or on known values, which parameter values are caused to influence the control member.

In the embodiment described with reference to FIG. 6b, the control signal can also be generated in dependence on the mode sum SSM(r) and the controllers shown in the figure consist of controllers arranged at the respective controllable network elements, or be integrated with this network element.

The invention can be applied to electric power networks of a varying kind, including the control of a.c. networks, such as, for example, for reduction of current harmonics in an a.c. network connected to an HVDC plant.

I claim:

1. A method for control of at least one of a first power network and a second power network interconnected by means of at least two electrical conductors, wherein the first power network comprises at least one of a first current and a first voltage generator and each with an associated internal impedance, said first and second power network comprising at least two controllable network elements, each of which is associated with a respective control signal, and a section B—B through said at least two electrical conductors is defined such that the first and second power networks are located on different sides of the section, comprising the steps of;

sensing a line current and a node voltage or a driving voltage at the section B—B, and selected such that each sensed voltage is calcuable from knowledge of a sensed current of the first power network and each sensed current is calcuable from knowledge of a sensed voltage of the first power network;

forming a base mode in dependence on the difference between either;

a) the sensed current or a linear combination of sensed currents and a sensed voltage, weighting said sensed voltage by an admittance function representing the dependence of said sensed current or the linear combination of sensed currents on said sensed voltage, which dependence is determined by the first power network; or b) a sensed voltage and either a sensed current or a linear combination of sensed currents, weighting said sensed current or the linear combination of sensed currents by an impedance function representing the dependence of the sensed voltage on said sensed current or linear combination of sensed currents, which dependence is determined by the first power network; and forming a mode in dependence on said base mode or a linear combination of base modes;

comparing said mode with a reference value associated with the mode;

forming at least one controller signal in dependence on the comparison between the mode and said reference value associated with the mode;

forming at least two controller distributing signals, each one as a product of a controller signal and a transfer function associated with the respective mode and the respective controller signal; and generating at least two control signals, each one in dependence on controller distributing signals originating from products formed with the transfer function associated with the respective control signal, and supplying each of said at least two control signals to the one of said at least two controllable network elements which is associated with the respective control signal, to change at least one of the currents and voltages occurring in at least one of the section B—B and the second power network and generated by said first current generator and/or first voltage generator, said control signals being independent of disturbance and impedance conditions in the second power network.

2. A method according to claim 1, wherein said at least one of a first current and a first voltage generator comprised in the first power network is a two-pole convertor station in a plant for transmission of high-voltage direct current, said two-pole convertor station having a ground mode current and a pole mode current, and wherein two modes and two controller signals are formed and further comprising the steps of;

forming a first mode in dependence on said ground mode current of the convertor station and a second mode in dependence on said pole mode current of the convertor station; and comparing said first mode with a first reference value associated with the first mode;

forming a first controller signal in dependence on the comparison between said first reference value and said first mode;

comparing said second mode with a second reference value associated with the second mode;

forming a second controller signal in dependence on the comparison between said second reference value and said second mode;

forming a first controller distributing signal as a product of said first controller signal and a transfer function associated with said first mode and a first control signal;

forming a second controller distributing signal as a product of said second controller signal and a transfer function associated with said second mode and a second control signal; and generating said first control signal in dependence on said first controller distributing signal and said second control signal in dependence on said second controller distributing signal; and supplying each of the first and the second control signals to the one of said two controllable network elements which is associated with the respective control signal, to influence at least one of the currents and voltages, occurring in at least one of the section B—B and the second power network and generated by said first current generator and/or first voltage generator, said control signals being independent of disturbance and impedance conditions in the second power network.

3. A method for control of at least one of a first power network and a second power network interconnected by means of at least two electrical conductors, wherein the first power network comprises at least one of a first current and a first voltage generator and each with an associated internal impedance, said first and second power network comprising at least two controllable network elements, each of which is associated with a respective control signal, and a section B—B through said at least two electrical conductors is defined such that the first and second power networks are located on different sides of the section, comprising the steps of;

sensing a line current and a node voltage or a driving voltage at the section B—B, and selected such that each sensed voltage is calcuable from knowledge of a sensed current of the first power network and each sensed current is calcuable from a sensed voltage of the first power network; and forming a base mode in dependence on a base mode or a linear combination of base modes;

a) said sensed current or a linear combination of sensed currents and a sensed voltage, weighting the sensed voltage by an admittance function representing the dependence of said sensed current or the linear combination of sensed currents on said voltage, which dependence is determined by the first power network; or b) a sensed voltage and either a sensed current or a linear combination of sensed currents, weighting the sensed current or the linear combination of sensed currents by an impedance function representing the dependence of the sensed voltage on said sensed current or linear combination of sensed currents, which dependence is determined by the first power network; and forming a mode in dependence on said base mode or a linear combination of base modes;

forming at least two mode distributing signals, each one as a product of a mode and a transfer function associated with the respective mode and the respective control signal; and generating said at least two control signals, each one in dependence on a mode distributing signal originating from products formed with the transfer function associated with the respective control signal, and supplying each of the at least two control signals to the one of said at least two controllable network elements which is associated with the respective control signal, to change at least one of the currents and voltages, occurring in at least one of the sections B—B and the second power network and generated by said at least one first current generator and first voltage generator, said control signals being independent of disturbance and impedance conditions in the second power network.

4. A method for control of at least one of a first power network and a second power network, wherein the first power network comprises a single-pole convertor station with a pole line and an electrode line in a plant for transmission of high-voltage direct current, the second power network being interconnected to the first power network by means of said pole line and said electrode line, and at least one of the first and the second power network comprising a controllable voltage generator connected between the pole line and the electrode line, and a section B—B through said pole line and said electrode line is defined such that the first and second power networks are located on different sides of the section, comprising the steps of;

sensing a line current at the single-pole convertor station and a harmonic voltage between the pole line and the electrode line;

forming a mode in dependence on either;

a) said harmonic current subtracted by the product of said harmonic voltage and a value of the admittance of the single-pole convertor station, as viewed from said controllable voltage generator; or b) said harmonic voltage subtracted by the product of said harmonic current and a value of the impedance of the single-pole convertor station, as viewed from said controllable voltage generator; and generating a control signal in dependence on said mode, and supplying said control signal to said controllable voltage generator to influence at least one of the currents and voltages, occurring in at least one of the section B—B and the second power network and generated by said single-pole convertor station, said control signal being independent of disturbance and impedance conditions in the second power network.

5. A method for control of at least one of a first power network and a second power network, wherein the first power network comprises a two-pole convertor station, each pole of which having a pole line and an electrode line, in a plant for transmission of high-voltage direct current, the second power network being interconnected to the first power network by means of said pole lines and electrode lines, said two-pole convertor station having a ground mode current, and at least one of the first and the second power network comprising a first controllable network element connected between a pole line and its associated electrode line, and a section B—B through said pole lines and electrode lines is defined such that the first and second power networks are located on different sides of the section comprising the steps of;

sensing at least one line current and at least one voltage between a pole line and an electrode line associated with said pole line, at the section B—B;

forming a first mode in dependence on said ground mode current; and generating a first control signal in dependence on said first mode, and supplying said first control signal to said first controllable network element to influence at least one of the currents and voltages, occurring in at least one of the section B—B and the second power network and generated by said two-pole convertor station, said first control signal being independent of disturbance and impedance conditions in the second power network.

6. A method according to claim 5, wherein at least one of the first and the second power networks further comprising a second controllable network element and said two-pole convertor station further having a pole mode current, further comprising the step of;

forming a second mode in dependence on said pole mode current; and generating a second control signal in dependence on said second mode, and supplying said second control signal to said second controllable network element to influence at least one of the currents and voltages, occurring in at least one of the section B—B and the second power network and generated by said two-pole convertor station.

7. A method for control of at least one of a first power network and a second power network, wherein the first power network comprises a two-pole convertor station in a plant for transmission of high-voltage direct current, said two-pole convertor station having a first and a second pole and each pole having a first pole line and an electrode line, the second power network being interconnected to the first power network by means of said pole lines and electrode lines, and wherein the first power network comprises a first controllable network element comprising a first active filter arranged at said first pole and a second controllable network element comprising a second active filter arranged at said second pole, and a section B—B through said pole lines and electrode lines is defined such that the first and second power networks are located on different sides of the section, comprising the steps of;

sensing a first harmonic current at said first pole, a first harmonic voltage between the pole line and the electrode line of said first pole, a second harmonic current sensed at said second pole and a second harmonic voltage between the pole line and the electrode line of said second pole;

forming a first base mode in dependence on either;

a) said first harmonic current subtracted by the product of said first harmonic voltage and a value of the admittance of said first pole, as viewed from said first active filter; or b) said first harmonic voltage subtracted by the product of said first harmonic current and a value of the impedance of said first pole, as viewed from said first active filter;

forming a second base mode in dependence on either;

c) said second harmonic current subtracted by the product of said second harmonic voltage and a value of the admittance of said second pole, as viewed from said second active filter, or d) said second harmonic voltage subtracted by the product of said second harmonic current and a value of the impedance of said second pole, as viewed from said second active filter;

forming a first mode in dependence on a difference between said first and second base mode and a second mode in dependence on a sum of said first and second base mode; and generating a first control signal in dependence on said first mode, and a second control signal in dependence on said second mode, and supplying said first control signal to said first active filter and said second control signal to said second active filter to influence at least one of the currents and voltages, occurring in at least one of the section B—B and the second power network and generated by said two-pole convertor station, said first and second control signals being independent of disturbance and impedance conditions in the second power network.

8. A method according to claim 7, further comprising the steps of; and comparing said first mode with a first reference value associated with the first mode;

forming a first controller signal in dependence on the comparison between said first reference value and said first mode;

comparing said second mode with a second reference value associated with the second mode;

forming a second controller signal in dependence on the comparison between said second reference value and said second mode;

forming a first controller distributing signal as a product of said first controller signal and a transfer function associated with said first mode and said first control signal;

forming a second controller distributing signal as a product of said second controller signal and a transfer function associated with said second mode and said second control signal; and generating said first control signal in dependence on said first controller distributing signal and said second control signal in dependence on said second controller distributing signal and supplying said first and second control signals to said first and second active filters, respectively.

9. A method for control of at least one of a first power network and a second power network, wherein the first power network comprises a two-pole convertor station, each pole of which having a pole line and an electrode line, in a plant for transmission of high-voltage direct current, the second power network being interconnected to the first power network by means of said pole lines and electrode lines and the second power network comprises a controllable network element connected between a pole line and its associated electrode line, and a section B—B through said pole lines and electrode lines is defined such that the first and second power networks are located on different sides of the section, and a section C—C through the second power network is defined such that the controllable network element comprised in the second power network is located, as viewed from the convertor station, on the other side of the section C—C, said two-pole convertor station having a ground mode current, at least a part of which flows through said section C—C, comprising the steps of;

sensing at least one line current and at least one voltage between a pole line and an electrode line associated with said pole line, at the section B—B;

forming a mode in dependence on said ground mode current, and generating at least one control signal in dependence on said mode, and supplying said control signal to said controllable network element comprised in the second power network to influence at least one of the currents and voltages, occurring in at least one of the section B—B and the second power network and generated by said two-pole convertor station, said control signal being independent of disturbance and impedance conditions in the second power network.

10. A method according to claim 9, further comprising the step of suppressing a predetermined frequency components or direct current/voltage component in the currents or voltages sensed at the section B—B.

11. A device for control of at least one of a first power network and a second power network interconnected by means of at least two electrical conductors, wherein the first power network comprises a first current or a first voltage generator and each with an associated internal impedance, said first and second power networks comprising at least two controllable network elements, each of which is associated with a respective control signal, and a section B—B through said at least two electrical conductors is defined such that the first and second power networks are located on different sides of the section, the device comprising:

a first measuring device for sensing at least one line current and at least one voltage at the section B—B, said voltage being either a node voltage or a driving voltage, said current and said voltage being selected such that each sensed voltage is calculated from knowledge of a sensed current of the first power network and each sensed current is calculated from a sensed voltage of the first power network;

a control member comprising at least two base mode filters, each forming a respective base mode, and comprising either;

a) means for weighting the sensed voltage by an admittance function representing the dependence of either a sensed current or a linear combination of sensed currents on said voltage, which dependence is determined by the first power network and said base mode filter forming the base mode in dependence on the difference between either a sensed current or a linear combination of sensed currents and the sensed voltage as sensed by said first measuring device, said sensed voltage being weighted by said admittance function; or b) means for weighting either a sensed current or a linear combination of sensed currents with an impedance function representing the dependence of the sensed voltage on said sensed current or linear combination of sensed currents, which dependence is determined by the first power network, and said base mode filter forming the base mode in dependence on the difference between the sensed voltage and either a sensed current or linear combination of sensed current as sensed by said first measuring device, said sensed current or linear combination of sensed currents being weighted by said impedance function; said weighting means being supplied with at least one of sensed current and linear combination of sensed currents and with sensed voltages, and being connected to summation and subtraction members provided in the base mode filters; and said control member further comprising a mode generator for forming a mode, said mode generator comprising at least two mode filters, each mode filter having a transfer function associated with a respective base mode and said mode, and a mode summator associated with said mode and having at least two inputs, said base mode filters supplying said respective base modes to said mode filters, and said mode filters with transfer functions associated with said mode providing respective output signals to said mode summator to form therein the mode at the sum of the outputs of said mode filters with transfer functions associated with said mode;

said control member further comprising a control distributor comprising at lest two distributor filters, each having a transfer function associated with the respective mode and a respective control signal, said at least two distributor filters having transfer functions associated with a particular mode being supplied with input signals originating from said mode generator and associated with the particular mode; and the control member generating said at least two respective control signals from the one of said at least two distributor filters having a transfer function associated with the respective control signal, said at least two control signals being supplied, each to the one of said at least two controllable network elements which is associated with the respective control signal, to influence at least one of the currents and voltages, occurring in at lest one of the section B—B and the second power network and generated by said at least one first current generator and first voltage generator said control signals being independent of disturbance and impedance conditions in the second power network.

12. A device according to claim 11, wherein said mode generator supplies a particular mode to said at least two distributor filters having transfer functions associated with said particular mode.

13. A device according to claim 11, wherein at least two modes are formed and wherein the control member comprises a multiplexor, being supplied with output signals from said distibutor filters, and further comprising a summator unit associated with each one of said at least two respective control signals, said summator unit being supplied with output signals from the multiplexor and forming the respective control signal as a sum of outputs signals from all of said at least two distributor filters having transfer functions associated with the respective control signal.

14. A device according to claim 11, wherein said first measuring device comprising means for suppressing at least one of predetermined frequency components and direct current/voltage components in at least one of the currents and voltages sensed at the section B—B.

15. A device according to claim 11, wherein said control member further comprises a mode controller associated with said mode, said mode generator supplying the mode to said mode controller, said mode controller comprising a comparator for comparing a reference value associated with the mode to form a comparison signal, said mode controller forming a controller signal dependent on said comparison signal; and said mode controller supplying a controller signal associated with a particular mode to said at least two distibutor filters with transfer functions associated with said particular mode.

16. A device according to claim 15, wherein said at least one of a first current and a first voltage generator comprised in the first power network is a a two-pole convertor station in a plant for transmission of high-voltage direct current, said two-pole convertor station having a ground mode current and a pole mode current, and wherein said control member comprises a mode generator for forming a first and a second mode and a first and a second mode controller;

said mode generator forms the first mode in dependence on said ground mode current, supplies said first mode to the first mode controller, said mode controller compares a first reference value with said first mode and forms a first controller signal;

said mode generator further forms the second mode in dependence on said pole mode current, supplies said second mode to the second mode controller, said mode controller compares a second reference value with said second mode and forms a second controller signal;

said first and second controller signals being supplied to said control distributor to form therein a first controller distributing signal as a product of said first controller signal and a transfer function associated with said first mode and a first control signal, and a second controller distributing signal as a product of said second controller signal and a transfer function associated with said second mode and a second control signal; and said control member generating said first control signal in dependence on said first controller distributing signal and said second control signal in dependence on said second controller distributing signal.

17. A device for control of at least one of a first power network and a second power network, wherein the first power network comprises a single-pole convertor station with a pole line and an electrode line in a plant for transmission of high-voltage direct current, the second power network being interconnected to the first power network by means of said pole line and said electrode line, and at least one of the first and the second power network comprising a controllable voltage generator connected between the pole line and the electrode line, and a section B—B through said pole line and said electrode line is defined such that the first and second power networks are located on different sides of the section, the device comprising:

a first measuring device for sensing a line current at the single-pole convertor station and a harmonic voltage between the pole line and the electrode line;

a control member comprising a mode generator for forming a mode in dependence on either a) said harmonic current subtracted by the product of said harmonic voltage and a value of the admittance of the single-pole convertor station, as viewed from said controllable voltage generator; or b) said harmonic voltage subtracted by the product of said harmonic current and a value of the impedance of the single-pole convertor station, as viewed from said controllable voltage generator; and said control member generates a control signal in dependence on said mode, and supplying said control signal to said controllable voltage generator to influence at least one of the currents and voltages, occurring in at least one of the section B—B and the second power network and generated by said single-pole convertor station, said control signal being independent of disturbance and impedance conditions in the second power network.

18. A device for control of at least one of a first power network and a second power network, wherein the first power network comprises a two-pole convertor station, each pole of which having a pole line and an electrode line, in a plant for transmission of high-voltage direct current, the second power network being interconnected to the first power network by means of said pole lines and electrode lines, said two-pole convertor station having a ground mode current, and at least one of the first and the second power network comprising a first controllable network element connected between a pole line and its associated electrode line, and a section B—B through said pole lines and electrode lines is defined such that the first and second power networks are located on different sides of the section, the device comprising:

a first measuring device for sensing at least one line current and at least one voltage between a pole line and an electrode line associated with said pole line, at the section B—B;

a control member comprising a mode generator for forming a first mode in dependence on said ground mode current; and said control member generates a first control signal in dependence on said first mode, said control signal being supplied to said first controllable network element to influence at least one of the currents and voltages, occurring in at least one of the section B—B and the second power network and generated by said two-pole convertor station, said first control signal being independent of disturbance and impedance conditions in the second power network.

19. A device according to claim 18, wherein at least one of the first and the second power networks further comprising a second controllable network element and said two-pole converor station further having a pole mode current;

said mode generator further forming a second mode in dependence on said pole mode current; and said control member further generates a second control signal in dependence on said second mode, said second control signal being supplied to said second controllable network element to influence at least one of the currents and voltages, occurring in at least one of the section B—B and the second power network and generated by said two-pole convertor station.

20. A device for control of at least one of a first power network and a second power network, wherein the first power network comprises a two-pole convertor station in a plant for transmission of high-voltage direct current, said two-pole convertor station having a first and a second pole and each pole having a first pole line and an electrode line, the second power network being interconnected to the first power network by means of said pole lines and electrode lines, and wherein the first power network comprises a first controllable network element comprising a first active filter arranged at said first pole and a second controllable network element comprising a second active filter arranged at said second pole, and a section B—B through said pole lines and electrode lines is defined such that the first and second power networks are located on different sides of the section, the device comprising:

a first measuring device for sensing a first harmonic current at said first pole, a first harmonic voltage between the pole line and the electrode line of said first pole, a second harmonic current sensed at said second pole and a second harmonic voltage between the pole line and the electrode line of said second pole;

a control member comprising a first base filter for forming a first base mode, and comprising either;

a) means for weighting said first harmonic voltage by a value of the admittance of said first pole, as viewed from said first active filter, and said first base mode filter forming said first base mode in dependence on a difference between said first harmonic current and said first harmonic voltage weighted by said admittance of said first pole; or b) means for weighting said first harmonic current with a value of the impedance of said first pole, as viewed from said first active filter, and said first base mode filter forming said first base mode in dependence on a difference between said first harmonic voltage and said first harmonic current weighted by said impedance of said first pole; and said control member further comprising a second base mode filter for forming a second base mode, and comprising either;

c) means for weighting said second harmonic voltage by a value of the admittance of said second pole, as viewed from said second active filter, and said second base mode filter forming said second base mode in dependence on a difference between said second harmonic current and said second harmonic voltage weighted by said admittance of said second pole; or d) means for weighting said second harmonic current with a value of the impedance of said second pole, as viewed from said second active filter, and said second base mode filter forming said second base mode in dependence on a difference between said second harmonic voltage and said second harmonic current weighted by said impedance of said second pole;

said weighting means being supplied with the respective said sensed harmonic currents and voltages, and being connected to summation and subtraction members provided in the respective base mode filters, and said control member further comprises a mode generator comprising a first and a second summator for forming a first mode and a second mode, said first and second base mode filters supplying said respective first and second base modes to said first and second summators to form in said first summator said first mode as a difference between said first and second base and to form in the second summator said second mode as a sum of said first and second base mode; and said control member generates a first control signal in dependence on said first mode and a second control signal in dependence on said second mode, and supplying said first control signal to said first active filter and said second control signal to said second active filter to influence at least one of the currents and voltages, occurring in at least one of the section B—B and the second power network and generated by said two-pole convertor station, said first and second control signals being independent of disturbance and impedance conditions in the second power network.

21. A decice according to claim 20, wherein the control member further comprises a first mode controller associated with said first mode, said mode generator supplying said first mode to said first mode controller, said first mode controller comprising a first comparator for comparing a first reference value associated with said first mode and the mode to form a first comparison signal, said first mode controller forming a first controller signal dependent on said first comparison signal; and a second mode controller associated with said second mode, said mode generator supplying said second mode to said second mode controller, said second mode controller comprising a second comparator for comparing a second reference value associated with said second mode and the mode to form a second comparison signal, said second mode controller forming a second controller signal dependent on said second comparison signal; and said control menber further comprising a control distributor comprising at least four distributor filters, each having transfer function associated with a respective mode and a respective control signal, said distributor filters having transfer functions associated with said first mode being supplied with said first controller signal, said distributor filters having transfer functions associated with said second mode being supplied with said second controller signal; and the control member generating said first control signal in dependence on output signals from distributor filters having a transfer function associated with said first control signal and said second control signal in dependence on output signals from distributor filters having a transfer function associated with said second control signal.

22. A device for control of at least one of a first power network and a second power network, wherein the first power network comprises a two-pole convertor station, each pole of which having a pole line and an electrode line, in a plant for transmission of high-voltage direct current, the second power network being interconnected to the first power network by means of said pole lines and electrode lines, and the second power network comprises a controllable network element connected between a pole line and its associated electrode line, and a section B—B through said pole lines and electrode lines is defined such that the first and second power networks are located on different sides of the section, and a section C—C through the second power network is defined such that the controllable network element comprised in the second power network, as viewed from the convertor station, is located on the other side of the section C—C, said convertor station having a ground mode current, at least a part of which flows through said section C—C, the device comprising:

a first measuring device for sensing at least one line current and at least one voltage between a pole line and an electrode line associated with said pole line, at the section B—B;

a control member comprising a mode generator for forming a mode in dependence on said ground mode current, and said control member generates at least one control signal in dependence on said mode, said control signal being supplied to said controllable network element comprised in the second power network to influence at least one of the currents and voltages, occurring in at least one of the section B—B and the second power network and generated by said two-pole convertor station, said control signal being independent of disturbance and impedance conditions in the second power network.

23. A device according to claim 22, wherein said control member further comprises at least one mode controller associated with said at least one mode, said mode generator supplying said at least one mode to said at least one mode controller, said at least one mode controller comprising a comparator for comparing a reference value associated with the mode and the mode to form a comparison signal, said at least one mode controller forming a controller signal dependent on said comparison signal; and said control member generates said at least one control signal in dependence on said controller signal.

24. A method for control of at least one of a first power network and a second power network interconnected by means of at least two electrical conductors, wherein the first power network comprises at least one of a first current and a first voltage generator and each with an associated internal impedance, and at least one of the first and the second power networks comprising at least one controllable network element, and a section B—B through said at least two electrical conductors is defined such that the first and the second power networks are located on different sides of the section, comprising the steps of:

sensing at least one line current and at least one voltage at the section B—B, said voltage being either a node voltage or a driving voltage, said at least one line current and said at least one voltage being selected such that each sensed voltage is calculated from said at least one sensed current of the first power network and each said at least sensed current is calculated from said at least one of a sensed voltage of the first power network;

forming at least one base mode in dependence on the difference between either;

a) said sensed current or a linear combination of sensed currents and at least one sensed voltage, weighting said at least one sensed voltage by an admittance function representing the dependence of said at least one of the sensed current or the linear combination of sensed currents on said at least one voltage, which dependence is determined by the first power network; or b) a sensed voltage and either a sensed current or a sensed current or a linear combination of sensed currents, weighting the sensed current or the linear combination of sensed currents by an impedance function representing the dependence of the sensed voltage on said sensed current or linear combination of sensed currents, which dependence is determined by the first power network; and forming a mode in dependence on said base mode or a linear combination of base modes; and generating at least one control signal in dependence on said mode, and supplying said at least one control signal to said at least one controllable network element to influence at least one of the currents and voltages, occurring in at least one of the section B—B and the second power network and generated by said at least one first current generator and first voltage generator, said control signal being independent of disturbance and impedance conditions in the second power network.

25. A method according to claim 24, wherein at least two control signals are generated, further comprising the steps of;

forming at least two mode distributing signals, each one as a product of a mode and a transfer function associated with the respective mode and the respective control signal, and generating said control signals, each one in dependence on a mode distributing signal originating from products formed with the transfer function associated with the respective control signal.

26. A method according to claim 24, wherein at least two control signals are generated, further comprising the steps of;

comparing said mode with a reference value associated with the mode;

forming a controller signal in dependence on the comparison between said reference value associated with the mode and the mode:

forming at least two controller distributing signals, each one as a product of a controller signal and a transfer function associated with the respective mode and the respective control signal, and generating said at least two control signals, each one in dependence on a controller distributing signal originating from products formed with the transfer function associated with the respective control signal.

27. A method according to claim 24, wherein the first and second power networks are interconnected by means of two electrical conductors, the first power network further comprises a controllable network element comprising a second voltage generator, and wherein said step of forming the mode further comprises either;

a) the step of forming the mode in dependence on a current sensed at one of the conductors, which current is subtracted by the product of a voltage between the two conductors and a value of the admittance of the first power network, as viewed from the second voltage generator; or b) the step of forming the mode in dependence on the voltage between the two conductors, subtracted by the product of a current sensed at one of the conductors and a value of the impedance of the first power network, as viewed from the second voltage generator;

comparing said mode with a reference value associated with the mode:

forming a controller signal in dependence on the comparison between said reference value associated with the mode and the mode, and generating a control signal in dependence on said at least one controller signal.

28. A device for control of at least one of a first power network and a second power network, which are interconnected by means of at least two conductors, wherein the first power network comprises at least one of a first current and a first voltage generator with associated internal impedance and at least one of the first and second power network comprises at least one controllable network element, and a section B—B through the conductors is defined such that the power networks are located on different sides of the section, the device comprising:

a first measuring device for sensing at least one line current and at least one voltage at the section B—B, said voltage being either a node voltage or a driving voltage, said at least one current and said at least one voltage being selected such that each sensed voltage is calcuable from said at least one sensed current of the first power network and each said at least one sensed current is calcuable from said at least one of a sensed voltage of the first power network;

a control member comprising a base mode filter for forming at least one base mode, said base mode filter having respective transfer functions, and a base mode summator, wherein either;

a) said at least one of a sensed current or a linear combination of sensed currents is supplied to one of said current filters having a transfer function equal to one, and further said at least one sensed voltage is supplied to said voltage filters having transfer functions calculated from the first power network and which at least approximately imitate admittance functions representing the dependence of said at least one of a sensed current or linear combination of sensed currents on said at least one sensed voltage, which dependence is determined by the first power network, and the output signals from the voltage filters, with a reversed sign, and the output signal from said one current filter are input to said at least one base mode summator to form therein the base mode, or b) a sensed voltage is supplied to one of said voltage filters having a transfer function equal to one, and further either at least one of said current or said at least one linear combination of currents sensed at the section B—B, is supplied to said current filters having transfer functions calculated from the first power network and which at least approximately imitate impedance functions representing the dependence of said sensed voltage on said either at least one of said current or at least one linear combination of currents sensed at the section B—B, which dependence is determined by the first power network, the output signals from the current filters, with a reversed sign, and the output signal from said one voltage filter are input to said base mode summator to form therein the base mode, and the control member further comprises a mode generator to generate a mode, said mode generator comprising at least two mode filters, each mode filter having a transfer function associated with a respective base node and said mode, and a mode summator associated with said mode, said base mode filters supplying said respective base modes to said mode filters with transfer functions associated with the respective mode, and said mode filters with transfer functions associated with said mode providing respective output signals to said mode summator to form therein the mode as the sum of the outputs of said mode filters with transfer functions associated with said at least one mode; and said control member generates at least one control signal in dependence on said at least one base mode, said at least one control signal being supplied to said at least one controllable network element to influence at least one of the currents and voltages occurring in at least one of the section B—B and the second power network and generated by said at least one first current generator and first voltage generator, said control signal being independent of disturbance and impedance conditions in the second power network.

29. A device according to claim 28, wherein the control member generates at least two respective control signals, and wherein the control member comprises a control distributor comprising at least two distributor filters, each having a transfer function associated with the respective mode and a respective control signal, said mode controller supplying a controller signal associated with a particular mode to said at least two distributor filters with transfer functions associated with said particular mode, and the control member generating said at least two respective control signals, each one being dependent on output signals from the one of said at least two distributor filters having a transfer function associated with the respective control signal.

30. A device according to claim 28, wherein at least two respective control signals are generated and wherein the control member comprises a mode controller associated with said mode, said mode generator supplying the mode to said mode controller, said mode controller comprising a comparator for comparing a reference value associated with the mode and the mode to form a comparison signal, said mode controller forming a controller signal dependent on said comparison signal; and the control member further comprises a control distributor comprising at least two distributor filters, each having a transfer function associated with the respective mode and a respective control signal, said mode controller supplying a controller signal associated with a particular mode to said at least two distributor filters with transfer functions associated with said particular mode, and the control member generating said at least two respective control signals, each one being dependent on output signals from the one of said at least two distributor filters having a transfer function associated with the respective control signal.

31. A device according to claim 28, wherein the first and the second power network are interconnected by two electrical conductors, the first power network further comprises a controllable network element comprising a second voltage generator, said first measuring device sensing a current at one of the electrical conductors and the voltage between the electrical conductors, and wherein the mode generator forms a mode in dependence on either;

a) said current sensed at one of the conductors, which current is subtracted by the product of said voltage between the two conductors and a value of the admittance of the first power network, as viewed from the second voltage generator; or b) said voltage between the two conductors, subtracted by the product of said current sensed at one of the conductors and a value of the impedance of the first power network, as viewed from the second voltage generator; and the control member comprises a mode controller associated with said mode, said mode generator supplying the mode to said mode controller, said mode controller comprising a comparator for comparing a reference value associated with the mode and the mode to form a comparison signal, said mode controller forming a controller signal dependent on said comparison signal, and said control member generating a control signal in dependence on said controller signal.

32. A method for control of a first power network or a second power network interconnected by means of at least two electrical conductors, wherein the first power network comprises a current or a voltage generator and each with an associated internal impedance, and one of the first or the second power network comprising a controllable network element, and a section B—B through said at least two electrical conductors is defined such that the first and second power networks are located on different sides of the section, comprising the steps of:

sensing a line current or a voltage of the section B—B, said line current and said voltage being selected such that each sensed voltage is determinable from a sensed current of the first power network and each sensed current is determinable from a sensed voltage of the first power network;

determining at least one of the following based on the structure of the first power network:

a) a transfer function which approximates the admittance function representing the dependence of said sensed current or a linear combination of sensed currents on said sensed voltage, and forming a base mode in dependence on the sum of: (1) said sensed current or (2) said linear combination of sensed currents and a linear combination of said sensed voltage with said transfer function having a reversed sign; and b) a transfer function which approximates the impedance function representing the dependence of the sensed voltage on said sensed current and a linear combination of said sensed current and forming a base mode in dependence on the sum of said sensed voltage and a linear combination of: (1) said sensed current or (2) a linear combination of sensed currents with said transfer function having a reversed sign; and generating a control signal in dependence on said base mode, and supplying said control signal to said controllable network element to change at least one of the currents and voltages occurring in at least one of the section B—B and the second power network and generated by at least one of said current generator and voltage generator, said control signal being independent of disturbance and impedance conditions in the second power network.

33. A method for control of a first power network or a second power network interconnected by means of at least two electrical conductors, wherein the first power network comprises a current or a voltage generator and each with an associated internal impedance, and the first or second power network comprising a current or a voltage generator and each with an associated internal impedance, and the first or the second power network comprising a controllable network element, and a section B—B through said at least two electrical conductors is defined such that the first and second power networks are located on different sides of the section, comprising the steps of:

sensing a line current and a voltage at the section B—B, said line current and said voltage being selected such that each sensed voltage is determinable from a sensed current of the first power network and each sensed current is determinable from a sensed voltage of the first power network; and a) supplying a model of the first power network, wherein all said current and voltage generators are replaced by the respective associated internal impedances thereof, with a value of a voltage sensed at the section B—B; and sensing the value of a current generated by the model; and forming a base mode in dependence on the difference between a value of a current or a linear combination of currents sensed at the section B—B and a value of said current generated by the model; or;

b) supplying a model of the first power network, wherein all said current and voltage generators are replaced by the respective associated internal impedance thereof, a value of current and a linear combination of currents sensed at the section B—B; and forming a base mode in dependence on the difference between the value of a voltage sensed at the section B—B and a value of said voltage generated by the model; and generating a control signal in dependence on said base mode, and supplying said control signal to said controllable network element to influence at least one of the currents and voltages occurring in at least one of the section B—B and the second power network and generated by one of said current generator or voltage generator, said control signal being independent of disturbance and impedance conditions in the second power network.

34. A method for control of a first power network or a second power network interconnected by at least two electrical conductors, wherein the first power network comprises a first current or a first voltage generator and each with an associated internal impedance, and one of the first or the second power network comprising a controllable network element, and a section B—B through said at least two electrical conductors is defined such that the first and second power networks are located on different sides of the section, comprising the steps of:

sensing a line current and a voltage at the section B—B, said line current and said voltage being selected such that each sensed voltage is determinable from the sensed current of the first power network and each sensed current is determinable from a sensed voltage of the first power network; and forming a base mode in dependence on the difference between:

a) (1) said sensed current or (2) a linear combination of sensed currents and a sensed voltage, weighting the sensed voltage by an admittance function representing the dependence of said sensed current or the linear combination of sensed currents on said voltage, which dependence is determined by the first power network; or b) a sensed voltage and a sensed current or a linear combination of sensed currents, weighting the sensed currents or the linear combination of sensed currents by an impedance function representing the dependence of the sensed voltage on said sensed current or said linear combination of sensed currents, which dependence is determined by the first power network; and forming a mode in dependence on a base mode or a linear combination of base modes; and generating a control signal in dependence on said mode, and supplying said control signal to said controllable network element to change the currents or voltages occurring in at least one of the section B—B and the second power network and generated by said first current generator or first voltage generator, said control signal being independent of disturbance and impedance conditions in the second power network.

35. A method according to claim 34, wherein the first and second power networks are interconnected by means of two electrical conductors, the first power network further comprises a controllable network element comprising a second voltage generator, and wherein said step of forming at least one mode further comprises at least one of;

a) the step of forming the mode in dependence on a current sensed at one of the conductors, which current is subtracted by the product of a voltage between the two conductors and an at least approximate value of the admittance of the first power network, as viewed from the second voltage generator; and b) the step of forming the mode in dependence on the voltage between the two conductors, subtracted by the product of a current sensed at one of the conductors and an at least approximate value of the impedance of the first power network, as viewed from the second voltage generator.

36. A method according to claim 34, further comprising the steps of:

comparing said mode with a reference value associated with the mode, forming a controller signal in dependence on the comparison between said reference value associated with the mode, and generating a control signal in dependence on said controller signal.

37. A method according to claim 36, further comprising the step of forming at least one controller signal in dependence on the result of the comparison between the reference value and the mode, with reversed sign.

38. A device for control of a first power network or a second power network interconnected by means of at least two electrical conductors, wherein the first power network comprises a current or a voltage generator and each with an associated internal impedance, and at least one of the first and the second power network comprising a controllable network element, and a section B—B through said at least two electrical conductors is defined such that the first and second power networks are located on different sides of the section B—B, the device comprising:

a first measuring device for sensing a line current and a voltage at the section B—B, said voltage being either a node voltage or a driving voltage, said current and said voltage being selected such that each sensed voltage is determinable from a sensed current of the first power network and each sensed current is determinable from a sensed voltage of the first power network;

a control member comprising a base mode filter for forming a base mode, said base mode filter comprising current filters and voltage filters, each having respective transfer functions, and a base mode summator, wherein:

a) one of said current filters having a transfer function equal to one receives a sensed current or a linear combination of sensed currents, and said voltage filters receive said sensed voltage and have transfer functions based on the structure of the first power network and which approximately conforms to the respective admittance functions thereof, and the output signals from the voltage filters, with a reversed sign, and the output signal from said one current filter are input to said base mode summator to form therein the base mode; or b) one of said voltage filters having a transfer function equal to one receive a sensed voltage, and said current filters having transfer functions based on the structure of the first power network receive a current or linear combination of currents sensed at the section B—B, said transfer functions approximately conform to the respective impedance functions thereof, the output signals from the current filters, with a reversed sign, and the output signal from said one voltage filter are input to said base mode summator to form therein the base mode, and said control member generates a control signal in dependence on said base mode, said control signal being supplied to said controllable network element to change the currents or voltages occurring in at least one of the section B—B and the second power network and generated by said first current generator or first voltage generator, said control signal being independent of disturbance and impedance conditions in the second power network.

39. A device for control of at least one of a first power network and a second power network interconnected by means of at least two electrical conductors, wherein the first power network comprises a first current or a first voltage generator and each with an associated internal impedance, and the first or the second power network comprising a controllable network element, and a section B—B through said at least two electrical conductors is defined such that the first and second power networks are located on different sides of the section, the device comprising:

a first measuring device for sensing a line current or a voltage at the section B—B, said voltage being a node voltage or a driving voltage, said line current or said voltage being selected such that each sensed voltage is calcuable from a sensed voltage of the first power network;

a control member comprising a model of the first power network in which all said first current and first voltage generators are replaced by the respective associated internal impedances thereof, a second current measuring device or a second voltage measuring device, and a summator supplied with at least one of:

a) a value of the current or a linear combination of currents sensed at the section B—B by said first measuring device, and said controllable signal generator receives a voltage value sensed at section B—B to generate, in dependence thereon, a voltage supplied to the model, and a value of a current generated by said model is sensed with said second current measuring device and said summator receives said value of current to form therein the base mode as a difference between said value of the current or the linear combination of currents sensed at the section B—B, and a value of current generated by the model and associated with the sensed current or the linear combination of sensed currents; or b) a value of the voltage sensed at the section B—B by said first measuring device, and said controllable signal generator receives a value of current or a linear combination of currents sensed at the section B—B by said first measuring device to generate, in dependence thereon, a current which is supplied to the model, and a voltage generated by said model is sensed with said second voltage measuring device and the summator receives the voltage value to form therein the base mode as a difference between the voltage value sensed at section B—B and a voltage value generated by the model and associated with the sensed voltage; and said control member generates a control signal in dependence on said base mode, said control signal being supplied to said controllable network element to change the currents or voltage occurring in at least one of the section B—B and the second power network and generated by said first current or first voltage generator, said control signal being independent of disturbance and impedance conditions in the second power network.

40. A device for a first power network or a second network interconnected by means of at least two electrical conductors, wherein the first power network comprises a first current or a first voltage generator and each with associated internal impedance, the first or the second power network comprising a controllable network element, and a section B—B through said at least two electrical conductors defined such that the first and second power networks are located on different sides of the section, the device comprising:

a first measuring device for sensing a line current and a voltage at the section B—B, said voltage being a node voltage or a driving voltage, said current and said voltage being selected such that each sensed voltage is determinable from a sensed current of the first power network and each sensed current is determinable from a sensed voltage of the first power network;

a control member comprising two base mode filters, each for forming a respective base mode and each comprising at least one of:

a) means for weighting the sensed voltage by an admittance function representing the dependence of a sensed current or a linear combination of sensed currents on said voltage, which dependence is determined by the first power network and said base mode filter forming the base mode in dependence on a difference between a sensed current or a linear combination of sensed currents and a voltage as sensed by said first measuring device, said sensed voltage being weighted by said one admittance function; or b) means for weighting a sensed current or a linear combination of sensed currents with an impedance function representing the dependence of the sensed voltage on said sensed current or a linear combination of sensed currents, which dependence is determined by the first power network, said base mode filter forming the base mode in dependence on a difference between the sensed voltage and a sensed current or a linear combination of sensed currents as sensed by said first measuring device, said sensed current or linear combination of sensed currents being weighted by said impedance function;

said weighting means receiving said sensed current or said linear combination of sensed currents and with a sensed voltage, and being connected to summation and subtraction members provided in the base mode filters; and the control member further comprising a mode generator for forming a mode, said mode generator comprising two mode filters, each mode filter having a transfer function associated with a respective base mode and said mode, and a mode summator associated with said mode, said base mode filters supplying said respective base mode to said mode filters, and said mode filters having transfer functions associated with said mode providing respective output signals to said mode summator to form therein the mode as the sum of the outputs of said mode filters having transfer functions associated with said mode, and the control member generating a control signal in dependence on said mode, said control signal being supplied to said controllable network element to change the currents or voltages occurring in the section B—B and the second power network and generated by said first current or first voltage generator, said control signal being independent of disturbances and impedance conditions in the second power network.

41. A device according to claim 40, wherein the control member generates at least two respective control signals, and wherein the control member comprises a control distributor comprising at least two distributor filters, each having a transfer function associated with the respective mode and a respective control signal, said mode generator supplies a particular mode to said at least two distributor filters having transfer functions associated with said particular mode, and the control member generating said at least two control signals, each one being dependent on output signals from the one of said at least two distributor filters having a transfer function associated with the respective control signal.

42. A device according to claim 40, wherein the first and the second power network are interconnected by two electrical conductors, the first power network further comprises a controllable network element comprising a second voltage generator, said first measuring device sensing a current at one of the electrical conductors and the voltage between the electrical conductors, and wherein said at least one of a sensed current and a linear combination of sensed currents is said current at one of the electrical conductors and said at least one sensed voltage is said voltage between the electrical conductors; and at least one of;

a) said admittance functions is an approximate value of the admittance of the first power network, as viewed from the second voltage generator; and b) said impedance functions is an approximate value of the impedance of the first power network, as viewed from the second voltage generator.

43. A device according to claim 40, wherein the first and the second power network are interconnected by two electrical conductors, the first power network further comprises a controllable network element comprising a second voltage generator, said first measuring device sensing a current at one of the electrical conductors and the voltage between the electrical conductors, and wherein said sensed current or a linear combination of sensed currents is said current at one of the electrical conductors and said sensed voltage is said voltage between the electrical conductors; and either:

a) said admittance functions are an approximate value of the admittance of the first power network, as viewed from the second voltage generator; or b) said impedance functions are an approximate value of the impedance of the first power network, as viewed from the second voltage generator.

44. A device according to claim 43, wherein said mode controller forms a controller signal in dependence on said comparison signal between the reference value and the mode, with reversed sign.

45. A device according to claim 40, wherein the control member comprises at least one mode controller associated with said at least one mode, said mode generator supplying the mode to said at least one mode controller, said at least one mode controller comprising a comparator for comparing a reference value associated with the mode and the mode to form a comparison signal, said at least one mode controller forming a controller signal dependent on said comparison signal, and said control member generating at least one control signal in dependence on said controller signal.

46. A device according to claim 45, wherein said at least one mode controller forms a controller signal in dependence on said comparison signal between the reference value and the mode, with reversed sign.

47. A device according to claim 45, wherein the control member generates at least two respective control signals, and wherein the control member comprises a control distributor comprising at least two distributor filters, each having a transfer function associated with the respective mode and a respective control signal, said mode controller supplying a controller signal associated with a particular mode to said at least two distributor filters with transfer functions associated with said particular mode, and the control member generating said at least two respective control signals, each one being dependent on output signals from the one of said at least two distributor filters having a transfer function associated with the respective control signal.

48. A device according to claim 47, wherein said mode generator forms at least two modes and wherein the control member comprises a multiplexor and further a summator unit associated with each one of said at least two respective control signals, said summator unit forming the control signal as a sum of filter output signals from all of said at least two distributor filters having transfer functions associated with the respective control signal.

* * * * *